United States Patent
Hsu et al.

(10) Patent No.: US 8,570,667 B2
(45) Date of Patent: *Oct. 29, 2013

(54) OPTICAL LENS ASSEMBLY FOR IMAGE CAPTURE

(75) Inventors: Po-Lun Hsu, Taichung (TW); Ming-Ta Chou, Taichung (TW); Tsung-Han Tsai, Taichung (TW)

(73) Assignee: Largan Precision Co., Taichung (TW)

( * ) Notice: Subject to any disclaimer, the term of this patent is extended or adjusted under 35 U.S.C. 154(b) by 181 days.

This patent is subject to a terminal disclaimer.

(21) Appl. No.: 13/189,243

(22) Filed: Jul. 22, 2011

(65) Prior Publication Data

US 2012/0243109 A1 Sep. 27, 2012

(30) Foreign Application Priority Data

Mar. 21, 2011 (TW) .............................. 100109617 A

(51) Int. Cl.
*G02B 13/18* (2006.01)
*G02B 9/16* (2006.01)

(52) U.S. Cl.
USPC ......................................... 359/716; 359/785

(58) Field of Classification Search
USPC .......... 359/713–716, 766, 773–774, 785, 790
See application file for complete search history.

(56) References Cited

U.S. PATENT DOCUMENTS

| | | | |
|---|---|---|---|
| 7,301,712 B2 | 11/2007 | Kamo | |
| 7,423,817 B2 | 9/2008 | Nakanishi | |
| 7,468,847 B2 | 12/2008 | Tang | |
| 7,679,841 B2 | 3/2010 | Chen et al. | |
| 7,710,662 B2 | 5/2010 | Nakanishi | |
| 7,848,032 B1 * | 12/2010 | Chen et al. | 359/715 |
| 8,014,080 B1 * | 9/2011 | Chen et al. | 359/715 |
| 2006/0119958 A1 * | 6/2006 | Jeong | 359/785 |
| 2009/0034099 A1 * | 2/2009 | Nakamura | 359/773 |
| 2012/0099009 A1 * | 4/2012 | Hsu et al. | 348/294 |

FOREIGN PATENT DOCUMENTS

WO 2010026689 A1 3/2010

* cited by examiner

*Primary Examiner* — Jordan Schwartz
(74) *Attorney, Agent, or Firm* — Wang Law Firm, Inc.; Li K. Wang; Stephen Hsu

(57) ABSTRACT

An optical lens assembly for image capture, in order from an object side to an image side, comprising: a first lens element with positive refractive power having a concave object-side surface and a convex image-side surface, a second lens element with negative refractive power having a concave object-side surfaces and a convex image-side surface, a third lens element with positive refractive power having bi-convex surface. Additionally, the optical lens assembly for image capture satisfies several desirable conditions. By such arrangements, the optical assembly for image capture can effectively correct the aberration and be used as a compact image pickup device for image taking.

8 Claims, 14 Drawing Sheets

OPTICAL LENS ASSEMBLY FOR IMAGE CAPTURE

BACKGROUND OF THE INVENTION

1. Field of the Invention

The present invention relates to an optical lens assembly for image capture, and more particularly to an optical lens assembly for image capture comprising three lens elements and the optical lens assembly is applied to an electronic product.

2. Description of the Related Art

Optical lens assembly for image capture is usually installed to a mini electronic device such as a digital still camera, a mobile phone camera and a web camera for capturing images of an object. The optical lens assembly for image capture tends to be developed with compact size, low cost, good aberration correction, high resolution, and high image quality.

In general, a conventional optical lens assembly for image capture for mini electronic products comes with different designs, including the two-lens, three-lens, four-lens, and five-or-more lens designs. Although the optical lens assemblies with the four-lens and five-lens designs have advantages on aberration correction and modulation transfer function (MTF) performance, yet they incur a higher cost. On the other hand, the optical lens assemblies with the two-lens design incur a lower cost, but they usually fail to meet the high-resolution requirements. Therefore, the optical lens assemblies with the three-lens design as disclosed in U.S. Pat. No. 7,468,847 and U.S. Pat. No. 7,679,841 and WIPO patent of WO2010026689 are preferred.

In the optical lens assembly for image capture with the three-lens design, the third lens element in proximity to the image plane always plays a role providing higher aberration ability and higher refractive power, and the bi-convex third lens element can provide higher refractive power. The bi-convex third lens element with positive refractive power as disclosed in U.S. Pat. No. 7,710,662, U.S. Pat. No. 7,423,817 and U.S. Pat. No. 7,301,712 adopts a combination design of positive refractive power, negative refractive power and positive refractive power. However, the first lens element disclosed in these patents provides insufficient positive refractive power near the object side and fails to collect more light, or the second lens element with negative refractive power has insufficient refractive power and hardly corrects the light collected by the first lens element. Therefore, the present invention provides a feasible design and adopts a combination of refractive powers of the three lens elements and a combination of convex and concave lens elements to achieve the effects of providing a high image quality, facilitating mass production to lower the cost, and applying the optical lens assembly to electronic products.

SUMMARY OF THE INVENTION

The primary objective of the present invention is to provide an optical lens assembly for image capture, comprising: a first lens element, a second lens element, and a third lens element sequentially arranged from an object side to an image side along an optical axis; and further comprising a stop; wherein the first lens element with positive refractive power has a concave object-side surface and a convex image-side surface; the second lens element with negative refractive power has a concave object-side surface and a convex image-side surface; the third lens element with positive refractive power is bi-convex; and the following condition is satisfied:

$$1.0 < f/f_1 < 1.9 \quad (1)$$

wherein f is a focal length of the optical lens assembly for image capture, and $f_1$ is a focal length of the first lens element.

In addition, the present invention provides an optical lens assembly for image capture as described above, wherein the second lens element and the third lens element are made of plastic, and each of the second lens element and the third lens element has an object-side surface and an image-side surface; at least one of the object-side surface and the third lens has at least one inflection point, and the optical assembly for image capture satisfies one or more of the following conditions in addition to the condition (1):

$$0.90 < SL/TTL < 1.20 \quad (2)$$

$$1.2 < f/f_1 < 1.6 \quad (3)$$

$$0.3 < |R_3/R_4| < 0.8 \quad (4)$$

$$24 < v_1 - v_2 < 40 \quad (5)$$

$$-0.7 < R_5/R_6 < 0 \quad (6)$$

$$0.6 < |f_2|/f_3 < 0.9 \quad (7)$$

wherein SL is an axial distance from a stop to an image plane, TTL is an axial distance from the object-side surface of the first lens element to the image plane, f is a focal length of the optical lens assembly for image capture, $f_1$ is a focal length of the first lens element, $f_2$ is a focal length of the second lens element, $f_3$ is a focal length of the third lens element, $R_3$ is a curvature radius of the object-side surface of the second lens element, $R_4$ is a curvature radius of the image-side surface of the second lens element, $R_5$ is a curvature radius of the object-side surface of the third lens element, $R_6$ is a curvature radius of the image-side surface of the third lens element, $v_1$ is an Abbe number of the first lens element, and $v_2$ is an Abbe number of the second lens element.

In addition, the present invention provides an optical lens assembly for image capture as described above, wherein the second lens element and the third lens element are made of plastic; at least one of the object-side surface and image-side surface of the second lens element is aspheric; at least one of the object-side surface and image-side surface of the third lens element is aspheric and has at least one inflection point, and the optical lens assembly for image capture satisfies the following condition in addition to the condition (1):

$$0.03 < CT_2/f < 0.13 \quad (8)$$

wherein $CT_2$ is a central thickness of the second lens element, and f is a focal length of the optical lens assembly for image capture.

It is another objective of the present invention to provide an optical lens assembly for image capture, comprising: a first lens element, a second lens element, and a third lens element sequentially arranged from an object side to an image side along an optical axis; and further comprising a stop; wherein the first lens element with positive refractive power has a concave object-side surface and a convex image-side surface; the second lens element comes with negative refractive power; the third lens element with positive refractive power is bi-convex; and the optical lens assembly for image capture satisfied one or more of the following conditions:

$$|R_3/R_4| < 1.3 \quad (9)$$

$$-0.7 < R_5/R_6 < 0 \quad (6)$$

wherein $R_3$ is a curvature radius of the object-side surface of the second lens element, $R_4$ is a curvature radius of the image-side surface of the second lens element, $R_5$ is a curvature radius of the object-side surface of the third lens element, and $R_6$ is a curvature radius of the image-side surface of the third lens element.

In addition, the present invention provides an optical lens assembly for image capture as described above, wherein the second lens element and the third lens element are made of plastic; at least one of the object-side surface and image-side surface of the second lens element is aspheric; at least one of the object-side surface and image-side surface of the third lens element is aspheric and has at least one inflection point, and the optical lens assembly for image capture satisfied one or more of the following conditions in addition to the conditions (9) and (6):

$$0.15 < T_{12}/f < 0.30 \quad (10)$$

$$1.2 < f/f_1 < 1.6 \quad (3)$$

$$0.3 < |R_3/R_4| < 0.8 \quad (4)$$

$$0.03 < CT_2/f < 0.13 \quad (8)$$

$$24 < v_1 - v_2 < 40 \quad (5)$$

wherein f is a focal length of the optical lens assembly for image capture, $f_1$ is a focal length of the first lens element, $T_{12}$ is an axial distance from the image-side surface of the first lens element to the object-side surface of the second lens element, $R_3$ is a curvature radius of the object-side surface of the second lens element, $R_4$ is a curvature radius of the image-side surface of the second lens element, $CT_2$ is a central thickness of the second lens element, $v_1$ is an Abbe number of the first lens element, and $v_2$ is an Abbe number of the second lens element.

In addition, the present invention provides an optical lens assembly for image capture as described above, wherein the second lens element has a concave object-side surface and a convex image-side surface.

It is a further objective of the present invention to provide an optical lens assembly for image capture comprising: a first lens element, a second lens element, and a third lens element, sequentially arranged from an object side to an image side along an optical axis; and further comprising a stop; wherein the first lens element with positive refractive power has a concave object-side surface and a convex image-side surface; the second lens element with negative refractive power is made of plastic and has a concave object-side surface and a convex image-side surface, and at least one of the object-side surface and image-side surface of the second lens element is aspheric; the third lens element with positive refractive power is made of plastic and bi-convex, and at least one of the object-side surface and image-side surface of the third lens element is aspheric and has at least one inflection point, and optical lens assembly for image capture satisfies the following condition:

$$-0.7 < R_5/R_6 < 0 \quad (6)$$

wherein $R_5$ is a curvature radius of the object-side surface of the third lens element, and $R_6$ is a curvature radius of the image-side surface of the third lens element.

In addition the present invention provides an optical lens assembly for image capture as described above, and the optical lens assembly for image capture satisfies one or more of the following conditions in addition to the condition (6):

$$1.0 < f/f_1 < 1.9 \quad (1)$$

$$0.3 < |R_3/R_4| < 0.8 \quad (4)$$

$$24 < v_1 - v_2 < 40 \quad (5)$$

$$0.90 < SL/TTL < 1.20 \quad (2)$$

wherein f is a focal length of the optical lens assembly for image capture, f1 is a focal length of the first lens element, $R_3$ is a curvature radius of the object-side surface of the second lens element, $R_4$ is a curvature radius of the image-side surface of the second lens element, $v_1$ is an Abbe number of the first lens element, $v_2$ is an Abbe number of the second lens element, SL is an axial distance from a stop to an image plane, TTL is an axial distance from the object-side surface of the first lens element to the image plane.

In the present invention, the first lens element, the second lens element and the third lens element are installed with an appropriate interval apart on the optical axis to increase the field angle of an optical system and obtain a good aberration correction and an advantageous modulation transfer function (MTF).

In the optical lens assembly for image capture of the present invention, the first lens element with stronger positive refractive power and the second lens element with negative refractive power can correct aberrations produced by the first lens element with positive refractive power effectively and correct the Petzval sum of the system to make the image surface on the edge flatter, while facilitating the correction of the chromatic aberration of the system to improve the resolution of the thin optical lens assembly. The third lens element is a bi-convex lens with positive refractive power and capable of increasing the width to correct the aberration produced by the first lens element and the second lens element effectively, such that the aberration and distortion of the optical lens assembly for image capture can meet the high-resolution requirement.

In the optical lens assembly for image capture of the present invention, the optical lens assembly further adds a stop which is a front stop formed between the first lens element and the object to be photographed for producing a longer distance between the exit pupil of the optical lens assembly for image capture and the image plane, so that the light of an image can be projected directly and received by the image sensor to avoid dark corners or achieve the telecentric effect on the image side. In general, the telecentric effect can improve the brightness of the image plane and enhance the speed of receiving images by the CCD or CMOS image sensor.

In the optical lens assembly for image capture of the present invention, an inflection point is designed at the third lens element and provided for guiding light of an image with an angle out from the edges of the third lens element, such that the light of an image at the off-axis view angle is guided to the image sensor and received by the image sensor. In addition, the second lens element comes with a convex image-side surface, and the combination of the convex third lens element on the object side can improve the width of the optical lens assembly for image capture and shorten the total length of the optical lens assembly for image capture effectively in order to apply the optical lens assembly to mini electronic devices.

DETAILED DESCRIPTION OF THE PREFERRED EMBODIMENTS

Figure 1A:
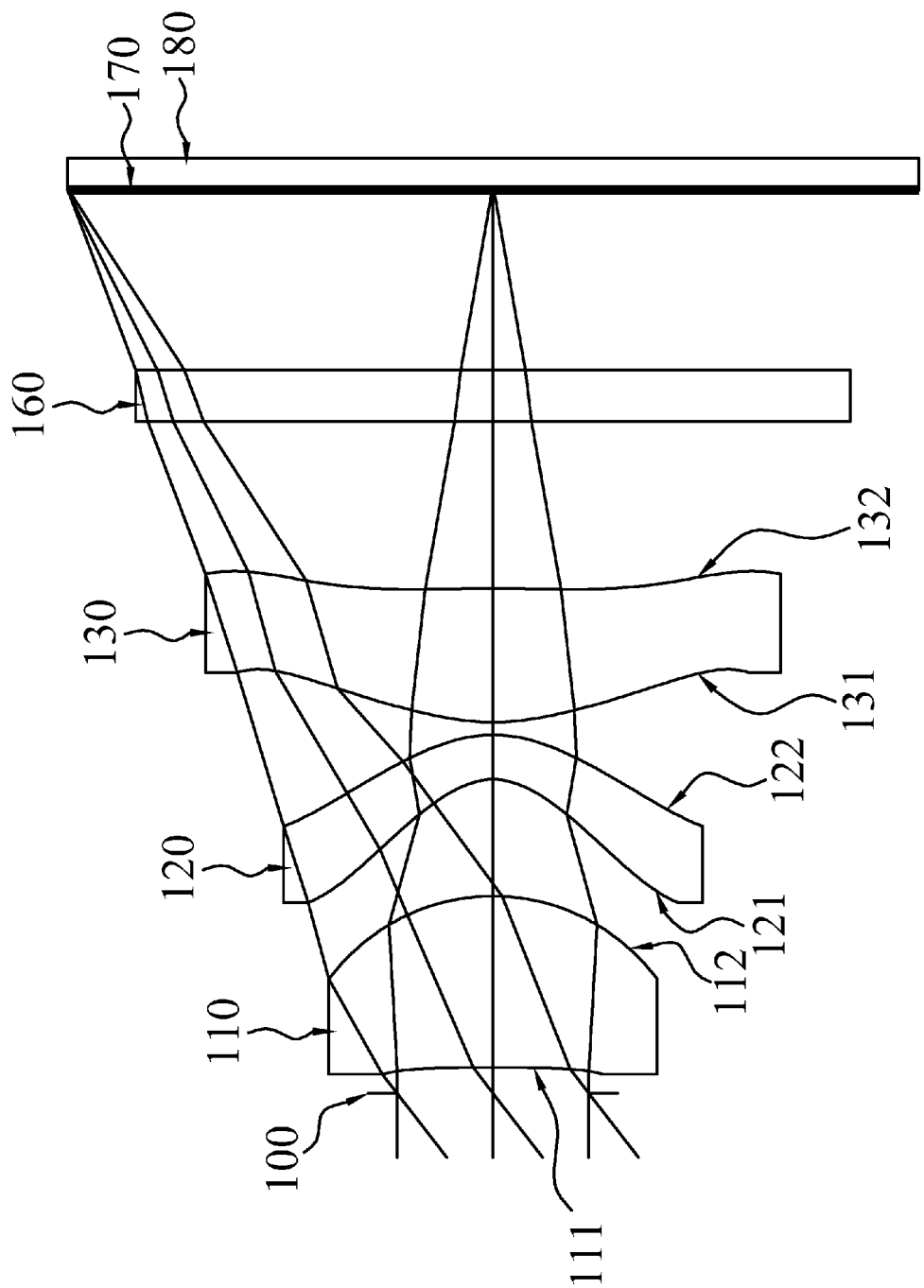
FIG. 1A is a schematic view of an optical lens assembly for image capture in accordance with the first preferred embodiment of the present invention.

The assembly and overall operation method of the present invention to achieve the foregoing objectives and effects will become apparent with the detailed description of preferred embodiments together with related drawings as follows:

With reference to FIG. 1A for an optical lens assembly for image capture of the present invention, the optical lens assembly for image capture comprises a first lens element (110), a second lens element (120) and a third lens element (130) sequentially arranged from an object side to an image side along an optical axis; wherein the first lens element (110) with positive refractive power has a concave object-side surface (111) and a convex image-side surface (112); the second lens element (120) with negative refractive power has a concave object-side surface (121) and a convex image-side surface (122); the third lens element (130) with positive refractive power has both convex object-side surface (131) and image-side surface (132); and the optical lens assembly for image capture further comprises a stop, which can be an aperture stop (100) and an IR-filter (160), and the aperture stop (100) is a front stop formed between the first lens element (110) and an object to be photographed; and the IR-filter (160) is installed between the third lens element (130) and the image plane (170) and generally made of a panel optical material which does not affect the focal length of the optical lens assembly for image capture of the present invention; and the optical lens assembly for image capture further comprises an image sensor (180) installed on the image plane (170) for imaging the object to be photographed. If the surfaces of the first lens element (110), the second lens element (120) and the third lens element (130) are aspheric surfaces, they comply with the aspherical surface formula as given in Equation (11) below:

$$X(Y) = \frac{(Y^2/R)}{1 + \sqrt{(1-(1+K)(Y/R)^2)}} + \sum_{i}(A_i)\cdot(Y^i) \quad (11)$$

wherein X is the relative distance from a point on the aspherical surface with a distance Y from the optical axis to a tangent plane perpendicular to the optical axis on the aspherical surface;

Y is the height between a point on the curve of the aspherical surface and the optical axis;

K is the conic coefficient; and

Ai is the $i^{th}$ level aspherical surface coefficient.

In the optical lens assembly for image capture of the present invention, the first lens element (110), the second lens element (120) and the third lens element (130) are made of glass or plastic, and can be spheric or aspheric. If an aspheric surface is adopted, the curvature radius of the aspheric surface can change the refractive power for eliminating aberrations, so as to reduce the number of lenses used in the optical lens assembly for image capture and shorten the total length of the optical lens assembly for image capture effectively. Therefore, the optical lens assembly for image capture of the present invention can satisfy the condition (1) by the aforementioned installation of the first lens element (110), the second lens element (120) and the third lens element (130). If the ratio of the focal length $f_1$ of the first lens element (110) to the focal length f of the optical lens assembly is limited, the first lens element (110) can have a shorter focal length. The refractive power of the first lens element (110) can be adjusted appropriately. If the focal length $f_1$ of the first lens element (110) is too small, then the total length of the optical lens assembly for image capture will be too large, such that the light entering into the image sensor of the optical lens assembly for image capture is larger. If the focal length $f_1$ of the first lens element (110) is too large, then the field angle of the optical lens assembly for image capture will be too small.

In the optical lens assembly for image capture of the present invention, if the condition (4) is satisfied, the surface shape and curvature of the object-side surface (121) and the image-side surface (122) of the second lens element (120) will become larger to improve the aberration correction ability. If the third lens element (130) satisfies the condition (6), such that the curvature radius $R_6$ of the image-side surface (132) of the third lens element (130) increases to reduce the aberration in proximity to the optical axis, and the inflection point approaches the edge of the lens, which are favorable for correcting off-axis spherical aberration. If the condition (5) is satisfied, the chromatic aberration of the optical lens assembly for image capture can be achieved easily. If the ratio of the thickness $CT_2$ of the second lens element (120) on the optical axis to the focal length f of the optical lens assembly for image capture is limited to the condition (8), the total length of the optical lens assembly for image capture can be limited. Similarly, if the condition (10) is satisfied, the distance $T_{12}$ from the image-side surface (112) of the first lens element (110) to the object-side surface (121) of the second lens element (120) can be reduced per unit length of the focal length f of the optical lens assembly for image capture, so as to shorten the total length of the optical lens assembly for image capture.

The optical lens assembly for image capture of the present invention is described by means of preferred embodiments with relevant drawings as follows.

First Preferred Embodiment

Figure 1B:
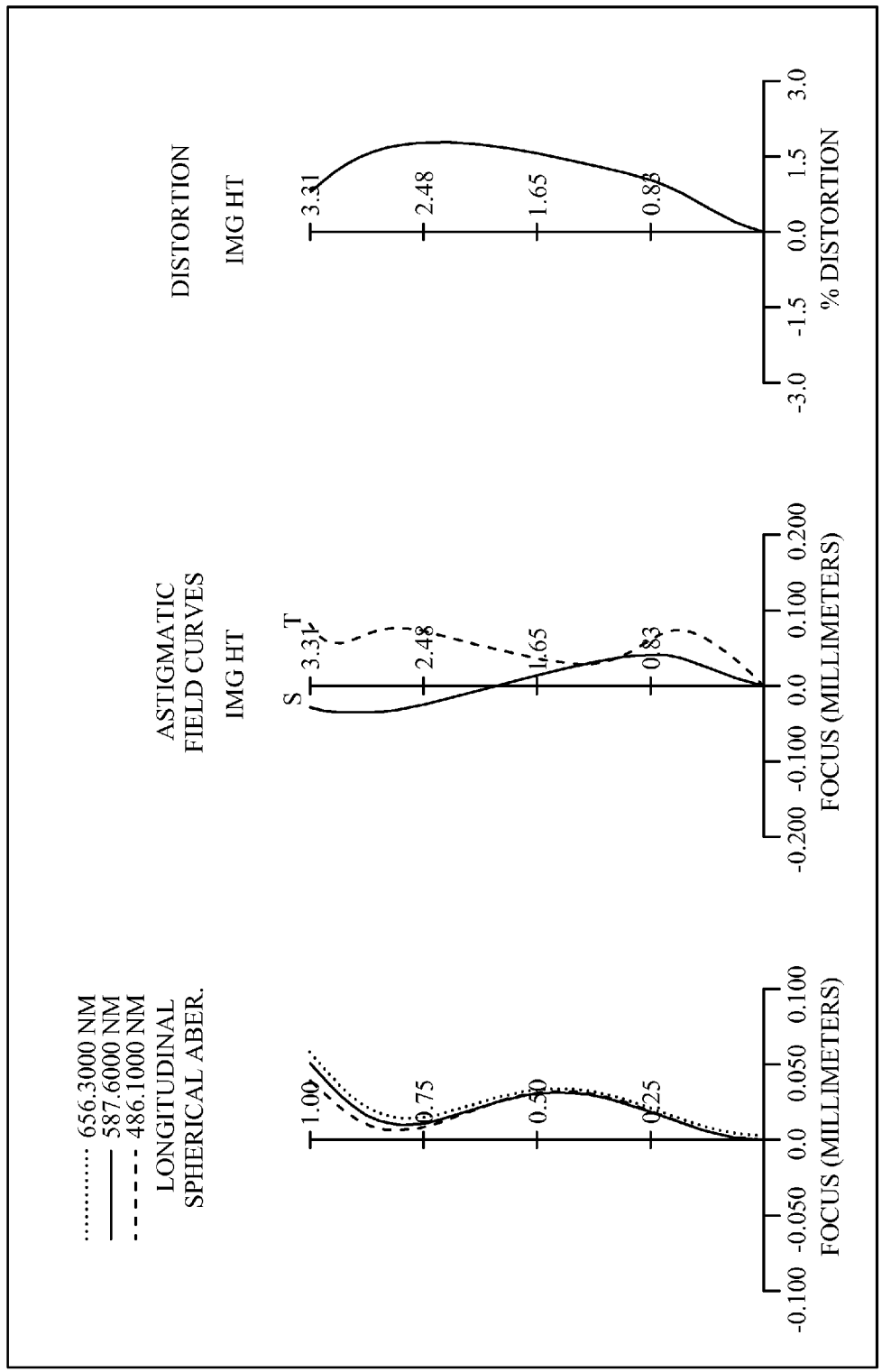
FIG. 1B is a series of aberration curves of the first preferred embodiment of the present invention.

With reference to FIGS. 1A and 1B for a schematic view and a series of aberration curves of an optical lens assembly for image capture in accordance with the first preferred embodiment of the present invention respectively, the optical lens assembly for image capture comprises three lens elements, an aperture stop (100) and an IR-filter (160). The optical lens assembly for image capture, sequentially arranged from an object side to an image side on an optical axis, comprises: the aperture stop (100); a first lens element (110) with positive refractive power, made of plastic, and having a concave object-side surface (111) and a convex image-side surface (112), and both object-side surface (111) and image-side surface (112) of the first lens element (110) being aspheric; a second lens element (120) with negative refractive power, made of plastic, and having a concave object-side surface (121) and a convex image-side surface (122), and both object-side surface (121) and image-side surface (122) of the second lens element (120) being aspheric; a bi-convex third lens element (130) with positive refractive power, made of plastic, and both object-side surface (131) and image-side surface (132) of the third lens element (130) being aspheric, and at least one of the object-side surface (131) and image-side surface (132) of the third lens element (130) having at least one inflection point; the IR-filter (160), made of glass, which is a panel glass for adjusting a wavelength section of the light of an image. With the combination of the three lens elements, the aperture stop (100) and the IR-filter (160), an image of the object to be photographed can be formed on an image plane (170).

TABLE 1

Optical data of this preferred embodiment
f = 4.25 mm, Fno = 2.85, HFOV = 37.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.200 | | | | |
| 2 | Lens 1 | −50.000000 (ASP) | 1.334 | Plastic | 1.544 | 55.9 | 3.04 |
| 3 | | −1.618160 (ASP) | 0.909 | | | | |
| 4 | Lens 2 | −0.500630 (ASP) | 0.347 | Plastic | 1.634 | 23.8 | −2.12 |
| 5 | | −1.012020 (ASP) | 0.099 | | | | |
| 6 | Lens 3 | 1.705500 (ASP) | 1.041 | Plastic | 1.535 | 56.3 | 2.94 |
| 7 | | −15.944000 (ASP) | 1.300 | | | | |
| 8 | IR- filter | Plano | 0.400 | Glass | 1.517 | 64.2 | — |
| 9 | | Plano | 1.399 | | | | |
| 10 | Image | Plano | — | | | | |

Note:
Reference wavelength is 587.6 nm. ASP stands for aspherical surfaces.

The optical data of this preferred embodiment are listed in Table 1, wherein the object-side surface and the image-side surface of the first lens element (110) to the third lens element (130) comply with the aspheric surface formula as given in Equation (11), and their aspheric coefficients are listed in Table 2 as follows:

TABLE 2

Aspheric coefficients of this preferred embodiment

| | Surface # | | |
|---|---|---|---|
| | 2 | 3 | 4 |
| k = | −1.00000E+00 | −3.73040E−01 | −1.79234E+00 |
| A4 = | −5.53885E−02 | −2.61929E−02 | −3.24390E−02 |

TABLE 2-continued

Aspheric coefficients of this preferred embodiment

| A6 = | 4.25811E−03 | 3.04015E−03 | 4.08196E−02 |
|---|---|---|---|
| A8 = | −9.18605E−02 | −1.18004E−02 | −5.68737E−03 |
| A10 = | 1.28638E−01 | 1.42707E−02 | 2.30214E−03 |
| A12 = | −1.82185E−01 | −7.60596E−03 | −9.40366E−04 |
| A14 = | 1.14336E−01 | 8.94358E−04 | 6.48338E−05 |
| A16 = | | 2.27494E−04 | |

| | Surface # | | |
|---|---|---|---|
| | 5 | 6 | 7 |
| k = | −2.80736E+00 | −1.18904E+01 | 0.00000E+00 |
| A4 = | −1.61897E−02 | 1.48271E−02 | 4.11411E−02 |
| A6 = | 1.80374E−02 | −2.47212E−03 | −4.94024E−03 |
| A8 = | −5.21758E−03 | −8.28646E−04 | −4.33412E−04 |
| A10 = | −1.45671E−04 | 1.28298E−04 | −1.07182E−04 |
| A12 = | 6.55019E−04 | −3.11569E−05 | 4.94059E−05 |
| A14 = | −1.18596E−04 | 2.43739E−06 | −3.95685E−06 |

With reference to Table 1 and FIG. 1B for the optical lens assembly for image capture of this preferred embodiment, the focal length of the optical lens assembly for image capture is f=4.25 (mm), the overall aperture value (f-number) of the optical lens assembly for image capture is Fno=2.85, the half of maximum view angle is HFOV=37.6°. After the optical data of this preferred embodiment are calculated and derived, the optical lens assembly satisfies related conditions as shown in Table 3 below, and the related symbols have been described above and thus will not be described again.

TABLE 3

Data of related relations of this preferred embodiment

| Relation | Data | Relation | Data |
|---|---|---|---|
| $v_1 - v_2$ | 32.1 | $R_5/R_6$ | −0.11 |
| $CT_2/f$ | 0.08 | $f/f_1$ | 1.40 |
| $T_{12}/f$ | 0.22 | $|f_2|/f_3$ | 0.72 |
| $|R_3/R_4|$ | 0.49 | SL/TTL | 1.03 |

According to the optical data as shown in Table 1 and the aberration curve as shown in FIG. 1B, the optical lens assembly for image capture in accordance with this preferred embodiment of the present invention provides good correction results in aspects of the longitudinal spherical aberration, astigmatic field curving, and distortion.

Second Preferred Embodiment

Figure 2A:
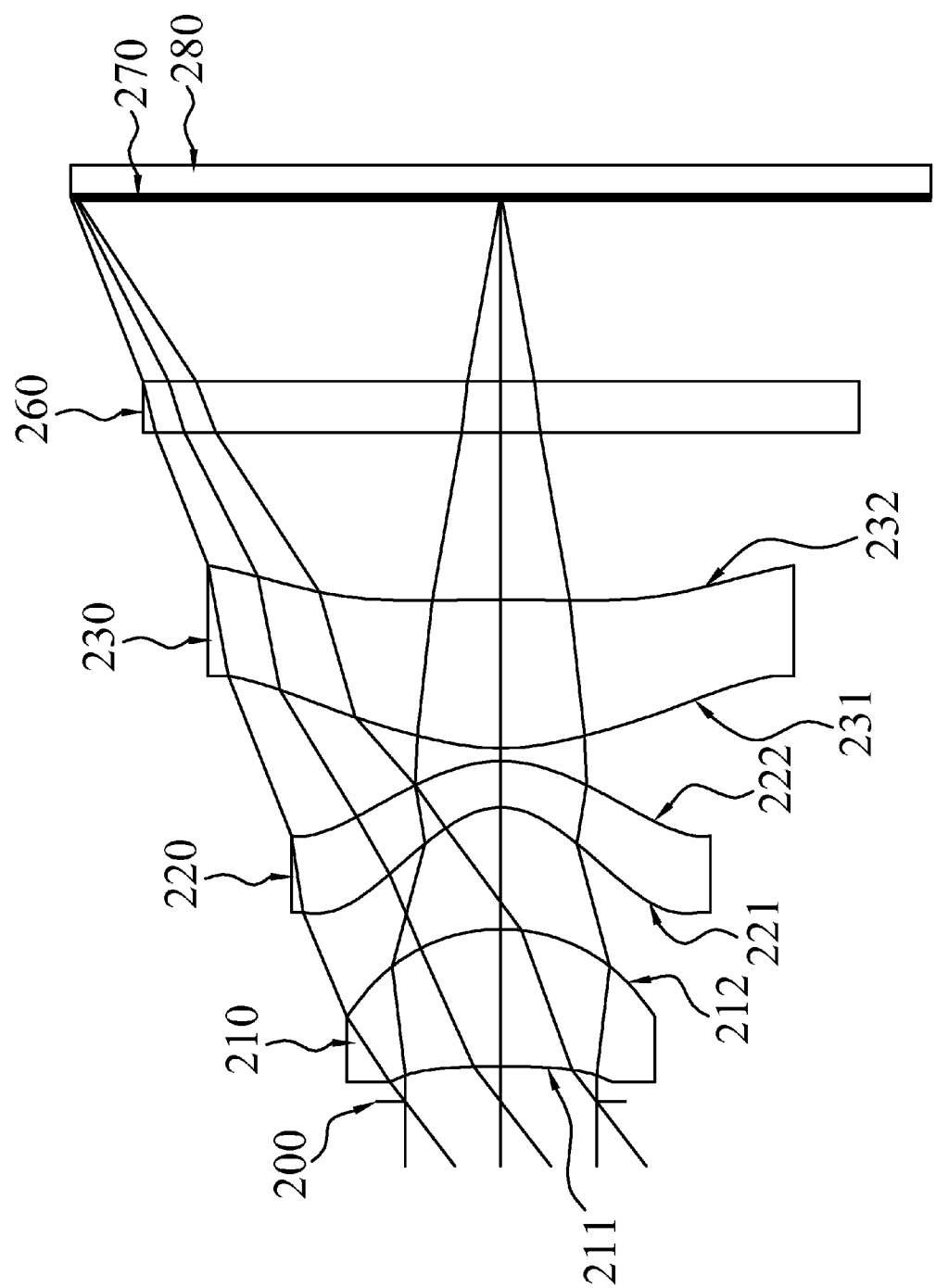
FIG. 2A is a schematic view of an optical lens assembly for image capture in accordance with the second preferred embodiment of the present invention.
Figure 2B:
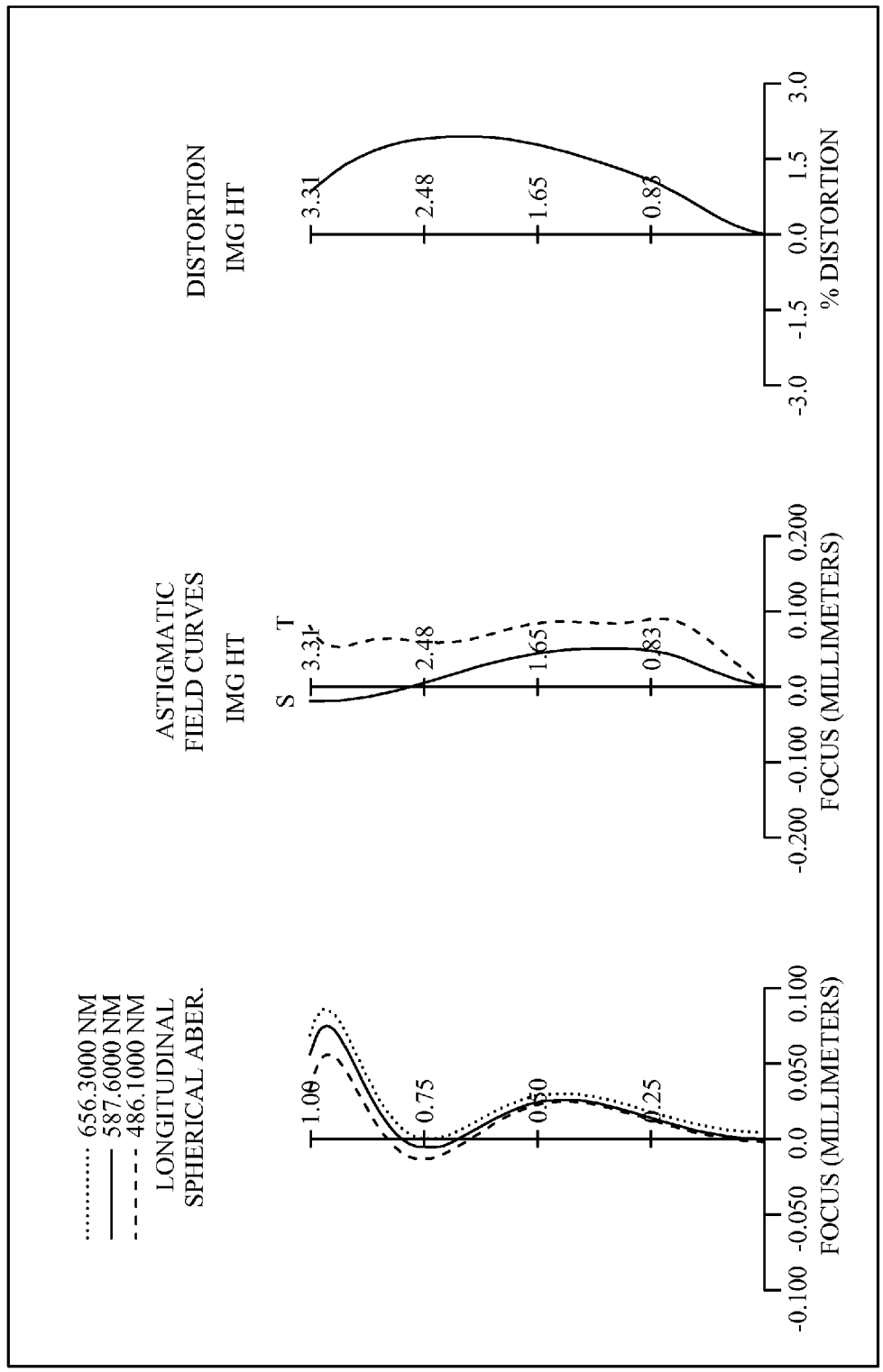
FIG. 2B is a series of aberration curves of the second preferred embodiment of the present invention.

With reference to FIGS. 2A and 2B for a schematic view and a series of aberration curves of an optical lens assembly for image capture in accordance with the second preferred embodiment of the present invention respectively, the optical lens assembly for image capture comprises three lens elements, an aperture stop (200) and an IR-filter (260). The optical lens assembly for image capture, sequentially arranged from an object side to an image side on an optical axis, comprises: the aperture stop (200); a first lens element (210) with positive refractive power, made of plastic, and having a concave object-side surface (211) and a convex image-side surface (212), and both object-side surface (211) and image-side surface (212) of the first lens element (210) being aspheric; a second lens element (220) with negative refractive power, made of plastic, and having a concave object-side surface (221) and a convex image-side surface (222), and both object-side surface (221) and image-side surface (222) of the second lens element (220) being aspheric;

a bi-convex third lens element (230) with positive refractive power, made of plastic, and both object-side surface (231) and image-side surface (232) of the third lens element (230) being aspheric, and at least one of the object-side surface (231) and image-side surface (232) of the third lens element (230) having at least one inflection point; the IR-filter (260), made of glass, which is a panel glass for adjusting a wavelength section of the light of an image. With the combination of the three lens elements, the aperture stop (200) and the IR-filter (260), an image of the object to be photographed can be formed on an image plane (270).

TABLE 4

Optical data of this preferred embodiment
f = 4.24 mm, Fno = 2.85, HFOV = 37.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.276 | | | | |
| 2 | Lens 1 | −8.546000 (ASP) | 1.066 | Plastic | 1.530 | 55.8 | 3.02 |
| 3 | | −1.405310 (ASP) | 0.948 | | | | |
| 4 | Lens 2 | −0.506520 (ASP) | 0.359 | Plastic | 1.634 | 23.8 | −2.18 |
| 5 | | −1.020400 (ASP) | 0.101 | | | | |
| 6 | Lens 3 | 1.754250 (ASP) | 1.154 | Plastic | 1.530 | 55.8 | 3.04 |
| 7 | | −15.287500 (ASP) | 1.300 | | | | |
| 8 | IR-filter | Plano | 0.400 | Glass | 1.517 | 64.2 | — |
| 9 | | Plano | 1.429 | | | | |
| 10 | Image | Plano | — | | | | |

Note:
Reference wavelength is 587.6 nm. ASP stands for aspherical surfaces.

The optical data of this preferred embodiment are listed in Table 4, wherein the object-side surface and the image-side surface of the first lens element (210) to the third lens element (230) comply with the aspheric surface formula as given in Equation (11), and their aspheric coefficients are listed in Table 5 as follows:

TABLE 5

Aspheric coefficients of this preferred embodiment

| | Surface # | | |
|---|---|---|---|
| | 2 | 3 | 4 |
| k = | −1.00000E+00 | −3.78698E−01 | −1.78938E+00 |
| A4 = | −7.66142E−02 | −2.38672E−02 | −2.81569E−02 |
| A6 = | −1.00968E−01 | −3.16739E−02 | 4.83917E−02 |
| A8 = | 1.79669E−01 | 1.66252E−02 | 1.06675E−02 |
| A10 = | −3.18507E−01 | 1.71306E−02 | −7.68467E−03 |
| A12 = | −1.20045E−01 | −2.77641E−02 | 6.21862E−04 |
| A14 = | 3.54767E−01 | −1.26604E−03 | 7.49865E−05 |
| A16 = | | 7.37143E−03 | |

| | Surface # | | |
|---|---|---|---|
| | 5 | 6 | 7 |
| k = | −2.78425E+00 | −1.16625E+01 | −1.00000E+00 |
| A4 = | −1.30532E−02 | 1.56492E−02 | 4.12032E−02 |
| A6 = | 1.94500E−02 | −1.43600E−03 | −4.16126E−03 |
| A8 = | −3.26108E−03 | −5.91796E−04 | −2.40254E−04 |
| A10 = | 1.72840E−04 | 2.95659E−05 | −1.01094E−04 |

TABLE 5-continued

Aspheric coefficients of this preferred embodiment

| A12 = | 3.33097E−04 | 1.13128E−05 | 3.94304E−05 |
|---|---|---|---|
| A14 = | −5.73773E−05 | −9.69373E−07 | −3.02487E−06 |

With reference to Table 4 and FIG. 2B for the optical lens assembly for image capture of this preferred embodiment, the focal length of the optical lens assembly for image capture is f=4.24 (mm), the overall aperture value (f-number) of the optical lens assembly for image capture is Fno=2.85, the half of maximum view angle is HFOV=37.7°. After the optical data of this preferred embodiment are calculated and derived, the optical lens assembly satisfies related conditions as shown in Table 6 below, and the related symbols have been described above and thus will not be described again.

TABLE 6

Data of related relations of this preferred embodiment

| Relation | Data | Relation | Data |
|---|---|---|---|
| $v_1 - v_2$ | 32.0 | $R_5/R_6$ | −0.11 |
| $CT_2/f$ | 0.08 | $f/f_1$ | 1.41 |
| $T_{12}/f$ | 0.22 | $|f_2|/f_3$ | 0.72 |
| $|R_3/R_4|$ | 0.50 | SL/TTL | 1.04 |

According to the optical data as shown in Table 4 and the aberration curve as shown in FIG. 2B, the optical lens assembly for image capture in accordance with this preferred embodiment of the present invention provides good correction results in aspects of the longitudinal spherical aberration, astigmatic field curving, and distortion.

Third Preferred Embodiment

Figure 3A:
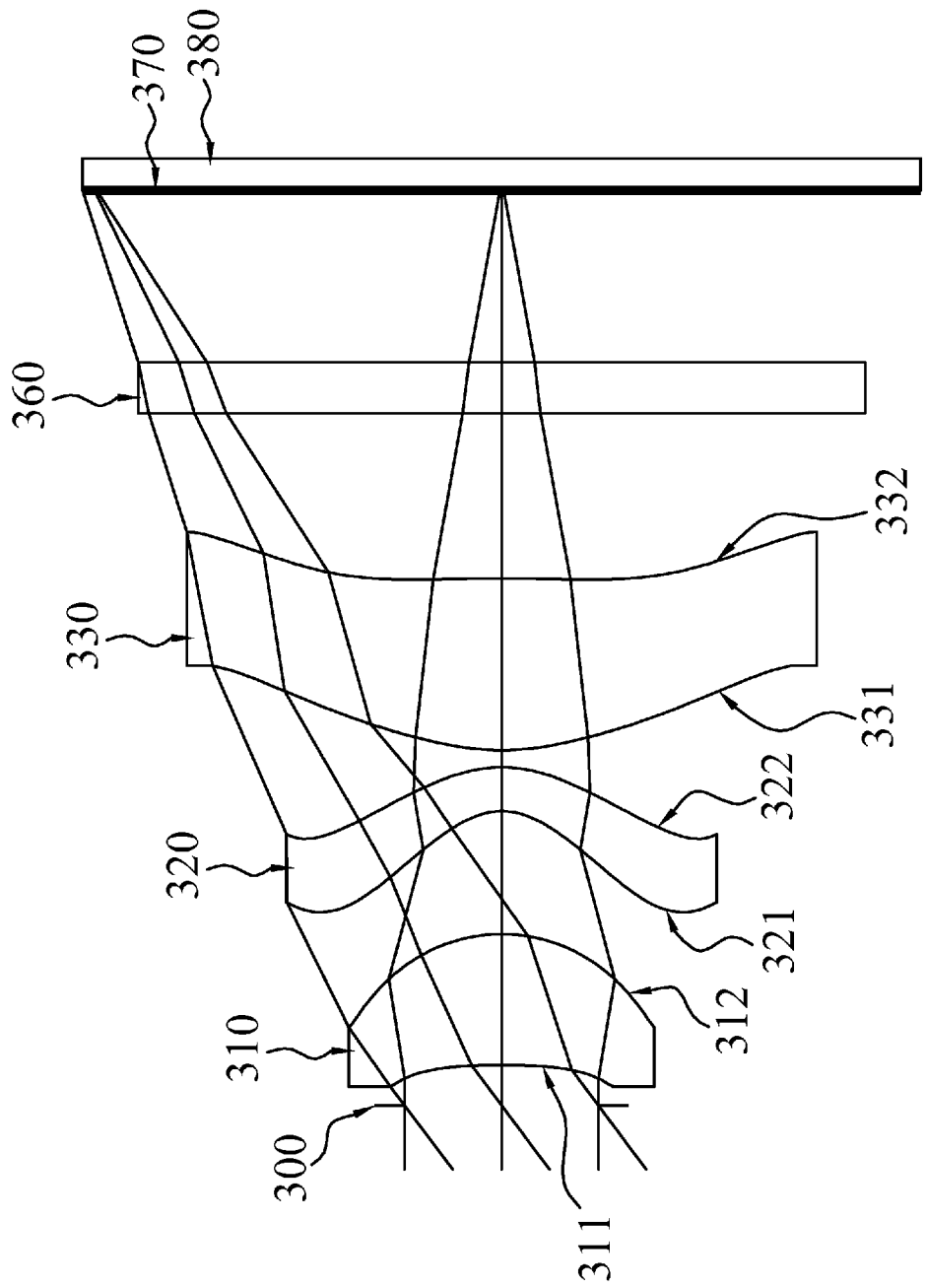
FIG. 3A is a schematic view of an optical lens assembly for image capture in accordance with the third preferred embodiment of the present invention.
Figure 3B:
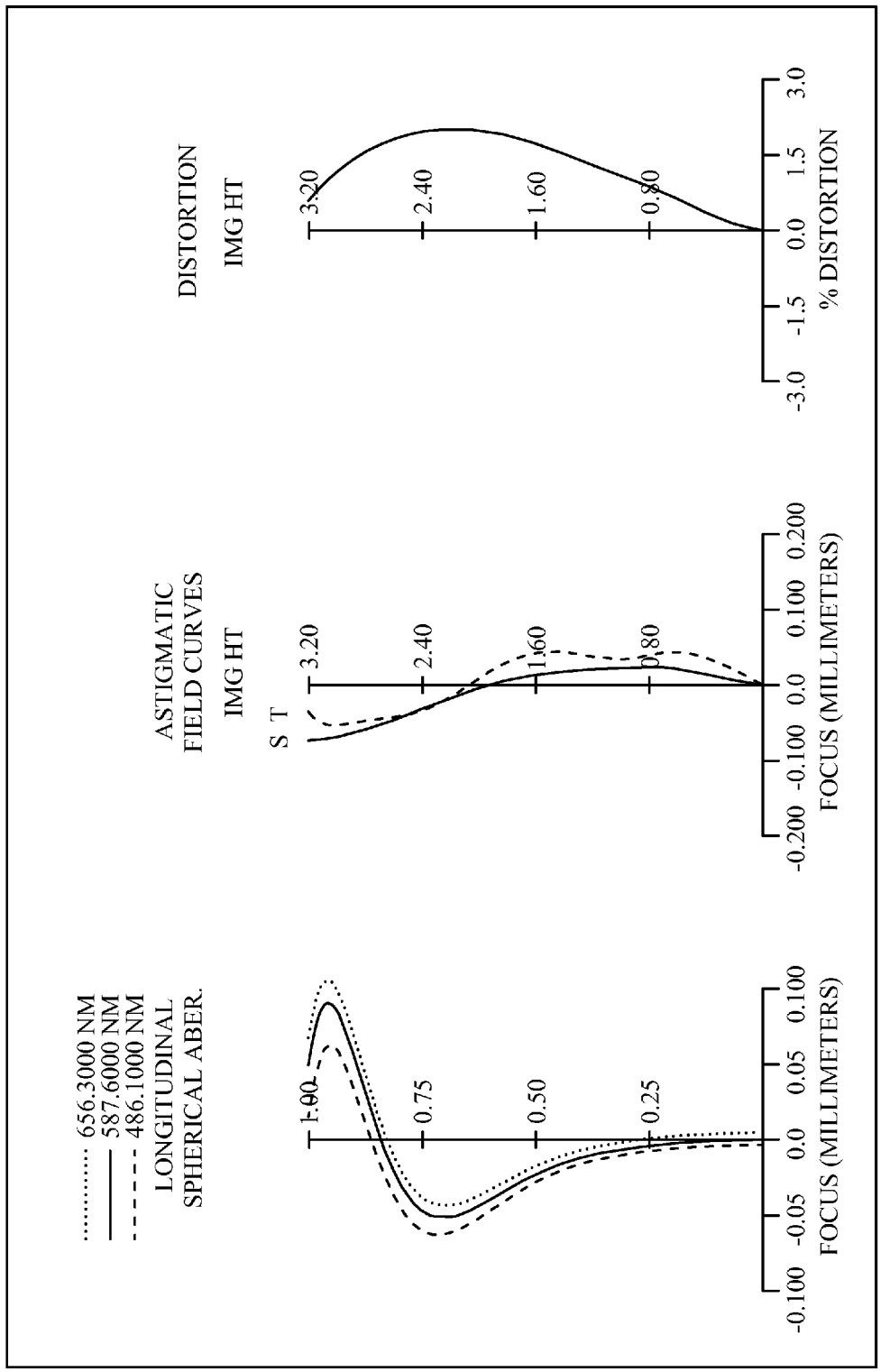
FIG. 3B is a series of aberration curves of the third preferred embodiment of the present invention.

With reference to FIGS. 3A and 3B for a schematic view and a series of aberration curves of an optical lens assembly for image capture in accordance with the third preferred embodiment of the present invention respectively, the optical lens assembly for image capture comprises three lens elements, an aperture stop (300) and an IR-filter (360). The optical lens assembly for image capture, sequentially arranged from an object side to an image side on an optical axis, comprises: the aperture stop (300); a first lens element (310) with positive refractive power, made of plastic, and having a concave object-side surface (311) and a convex image-side surface (312), and both object-side surface (311) and image-side surface (312) of the first lens element (310) being aspheric; a second lens element (320) with negative refractive power, made of plastic, and having a concave object-side surface (321) and a convex image-side surface (322), and both object-side surface (321) and image-side surface (322) of the second lens element (320) being aspheric; a bi-convex third lens element (330) with positive refractive power, made of plastic, and both object-side surface (331) and image-side surface (332) of the third lens element (330) being aspheric, and at least one of the object-side surface (331) and image-side surface (332) of the third lens element (330) having at least one inflection point; the IR-filter (360), made of glass, which is a panel glass for adjusting a wavelength section of the light of an image. With the combination of the three lens elements, the aperture stop (300) and the IR-filter (360), an image of the object to be photographed can be formed on an image plane (370).

TABLE 7

Optical data of this preferred embodiment
f = 4.26 mm, Fno = 2.80, HFOV = 36.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.321 | | | | |
| 2 | Lens 1 | −5.200100 (ASP) | 1.029 | Plastic | 1.522 | 52.2 | 2.97 |
| 3 | | −1.275600 (ASP) | 0.967 | | | | |
| 4 | Lens 2 | −0.507970 (ASP) | 0.345 | Plastic | 1.632 | 23.4 | −2.16 |
| 5 | | −1.020950 (ASP) | 0.133 | | | | |
| 6 | Lens 3 | 1.799800 (ASP) | 1.352 | Plastic | 1.530 | 55.8 | 3.08 |
| 7 | | −13.054000 (ASP) | 1.300 | | | | |
| 8 | IR-filter | Plano | 0.400 | Glass | 1.517 | 64.2 | — |
| 9 | | Plano | 1.352 | | | | |
| 10 | Image | Plano | — | | | | |

Note:
Reference wavelength is 587.6 nm. ASP stands for aspherical surfaces.

The optical data of this preferred embodiment are listed in Table 7, wherein the object-side surface and the image-side surface of the first lens element (310) to the third lens element (330) comply with the aspheric surface formula as given in Equation (11), and their aspheric coefficients are listed in Table 8 as follows:

TABLE 8

Aspheric coefficients of this preferred embodiment

| | Surface # | | |
|---|---|---|---|
| | 2 | 3 | 4 |
| k = | −1.00000E+00 | −4.74380E−01 | −1.80465E+00 |
| A4 = | −8.30222E−02 | −1.88304E−02 | −1.88485E−02 |
| A6 = | −1.38442E−01 | −3.54292E−02 | 5.61154E−02 |
| A8 = | 1.38490E−01 | 1.28641E−02 | 2.05086E−03 |
| A10 = | −6.39086E−02 | 2.60823E−02 | −6.30718E−03 |
| A12 = | −5.54156E−01 | −2.53983E−02 | 1.14347E−03 |
| A14 = | 6.03165E−01 | −1.48256E−02 | −4.55778E−05 |
| A16 = | | 1.41078E−02 | |

| | Surface # | | |
|---|---|---|---|
| | 5 | 6 | 7 |
| k = | −2.89347E+00 | −1.17986E+01 | −1.00000E+00 |
| A4 = | −9.74934E−03 | 1.66782E−02 | 4.11951E−02 |
| A6 = | 2.08438E−02 | −6.93189E−04 | −2.63155E−03 |
| A8 = | −4.82199E−03 | −7.12093E−04 | −4.19446E−04 |
| A10 = | 1.18790E−04 | 4.52054E−05 | −1.20012E−04 |
| A12 = | 5.02639E−04 | 1.62796E−05 | 4.67463E−05 |
| A14 = | −6.80252E−05 | −2.00247E−06 | −3.65591E−06 |

With reference to Table 7 and FIG. 3B for the optical lens assembly for image capture of this preferred embodiment, the focal length of the optical lens assembly for image capture is f=4.26 (mm), the overall aperture value (f-number) of the optical lens assembly for image capture is Fno=2.80, the half of maximum view angle is HFOV=36.8°. After the optical data of this preferred embodiment are calculated and derived, the optical lens assembly satisfies related conditions as shown in Table 9 below, and the related symbols have been described above and thus will not be described again.

TABLE 9

Data of related relations of this preferred embodiment

| Relation | Data | Relation | Data |
|---|---|---|---|
| $v_1 - v_2$ | 28.8 | $R_5/R_6$ | −0.14 |
| $CT_2/f$ | 0.08 | $f/f_1$ | 1.44 |
| $T_{12}/f$ | 0.23 | $|f_2|/f_3$ | 0.70 |
| $|R_3/R_4|$ | 0.50 | SL/TTL | 1.05 |

According to the optical data as shown in Table 7 and the aberration curve as shown in FIG. 3B, the optical lens assembly for image capture in accordance with this preferred embodiment of the present invention provides good correction results in aspects of the longitudinal spherical aberration, astigmatic field curving, and distortion.

Fourth Preferred Embodiment

Figure 4A:
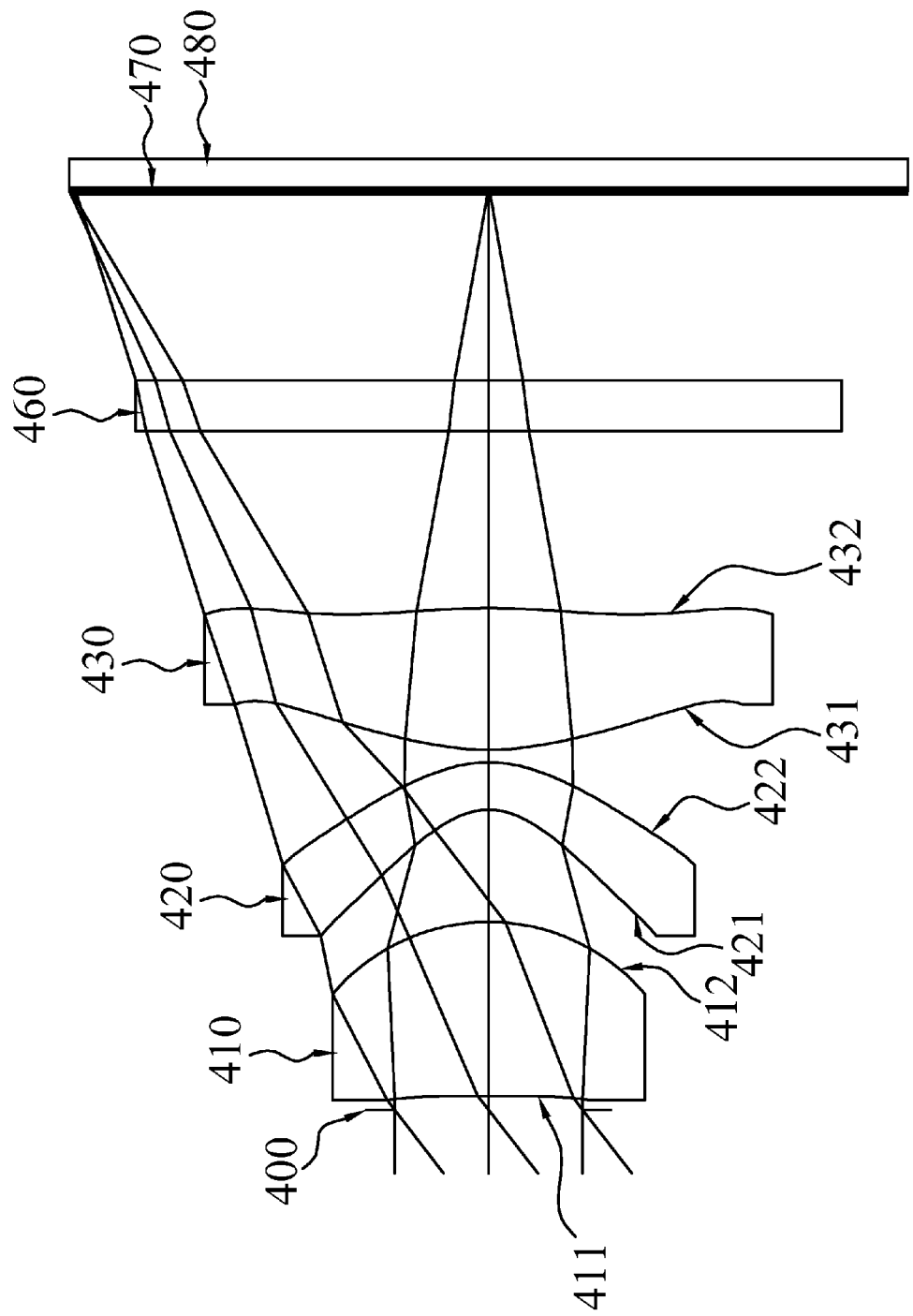
FIG. 4A is a schematic view of an optical lens assembly for image capture in accordance with the fourth preferred embodiment of the present invention.
Figure 4B:
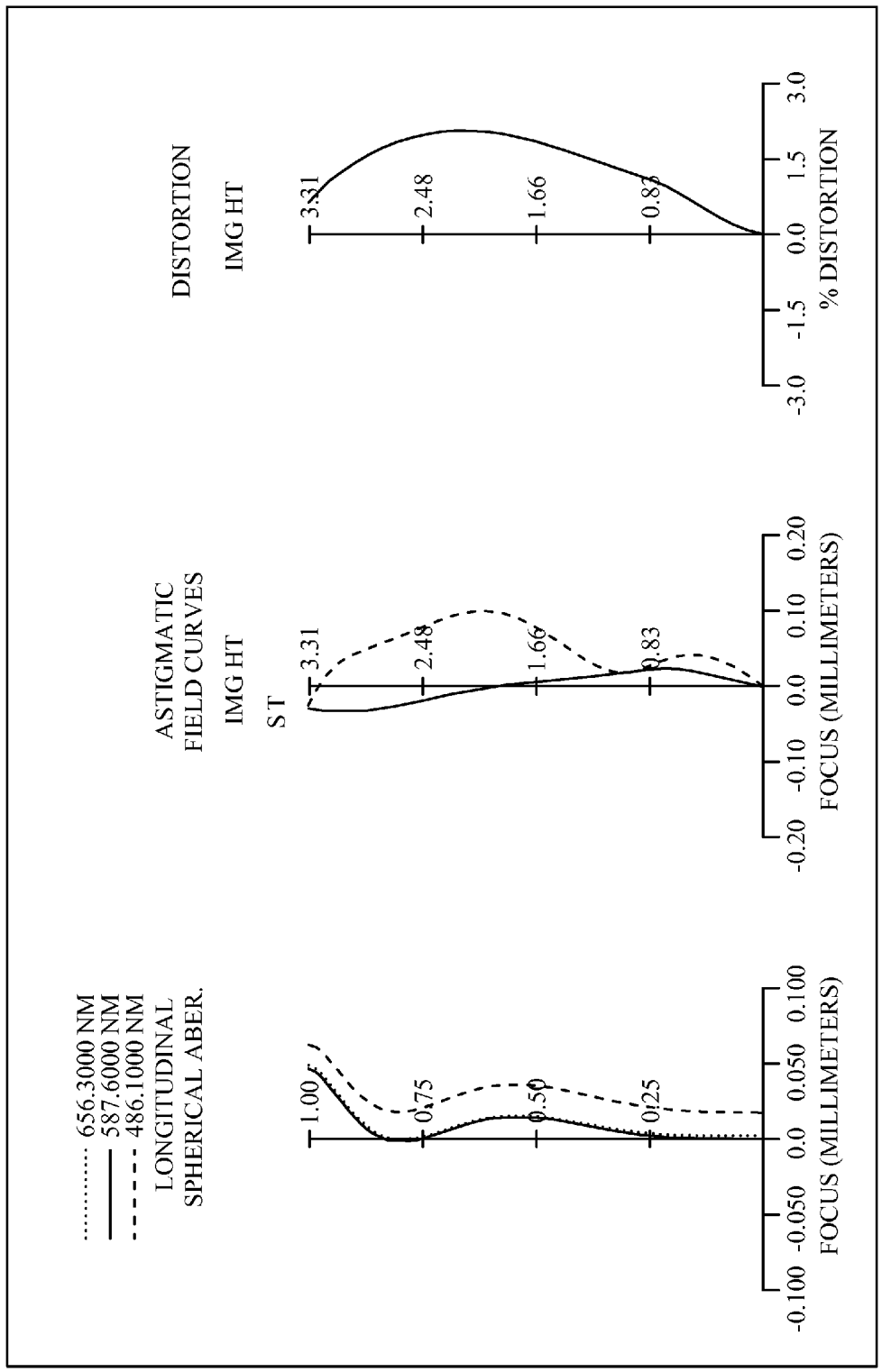
FIG. 4B is a series of aberration curves of the fourth preferred embodiment of the present invention.

With reference to FIGS. 4A and 4B for a schematic view and a series of aberration curves of an optical lens assembly for image capture in accordance with the fourth preferred embodiment of the present invention respectively, the optical lens assembly for image capture comprises three lens elements, an aperture stop (400) and an IR-filter (460). The optical lens assembly for image capture, sequentially arranged from an object side to an image side on an optical axis, comprises: the aperture stop (400); a first lens element (410) with positive refractive power, made of plastic, and having a concave object-side surface (411) and a convex image-side surface (412), and both object-side surface (411) and image-side surface (412) of the first lens element (410) being aspheric; a second lens element (420) with negative refractive power, made of plastic, and having a concave object-side surface (421) and a convex image-side surface (422), and both object-side surface (421) and image-side surface (422) of the second lens element (420) being aspheric; a bi-convex third lens element (430) with positive refractive power, made of plastic, and both object-side surface (431) and image-side surface (432) of the third lens element (430) being aspheric, and at least one of the object-side surface (431) and image-side surface (432) of the third lens element (430) having at least one inflection point; the IR-filter (460), made of glass, which is a panel glass for adjusting a wavelength section of the light of an image. With the combination of the three lens elements, the aperture stop (400) and the IR-filter (460), an image of the object to be photographed can be formed on an image plane (470).

TABLE 10

Optical data of this preferred embodiment
f = 4.23 mm, Fno = 2.85, HFOV = 37.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.110 | | | | |
| 2 | Lens 1 | −45.662100 (ASP) | 1.375 | Plastic | 1.544 | 55.9 | 3.06 |
| 3 | | −1.623920 (ASP) | 0.887 | | | | |
| 4 | Lens 2 | −0.502340 (ASP) | 0.374 | Plastic | 1.650 | 21.4 | −2.13 |
| 5 | | −1.020720 (ASP) | 0.099 | | | | |

TABLE 10-continued

Optical data of this preferred embodiment
f = 4.23 mm, Fno = 2.85, HFOV = 37.8 deg.

| Surface # | | Curvature Radius | Thickness | Material | Index | Abbe # | Focal Length |
|---|---|---|---|---|---|---|---|
| 6 | Lens 3 | 2.046910 (ASP) | 1.119 | Plastic | 1.535 | 56.3 | 2.96 |
| 7 | | −5.681500 (ASP) | 1.400 | | | | |
| 8 | IR- | Plano | 0.400 | Glass | 1.517 | 64.2 | — |
| 9 | filter | Plano | 1.496 | | | | |
| 10 | Image | Plano | — | | | | |

Note:
Reference wavelength is 587.6 nm. ASP stands for aspherical surfaces.

The optical data of this preferred embodiment are listed in Table 10, wherein the object-side surface and the image-side surface of the first lens element (410) to the third lens element (430) comply with the aspheric surface formula as given in Equation (11), and their aspheric coefficients are listed in Table 11 as follows:

TABLE 11

Aspheric coefficients of this preferred embodiment

| | Surface # | | |
|---|---|---|---|
| | 2 | 3 | 4 |
| k = | −1.00000E+00 | −6.11697E−01 | −1.73835E+00 |
| A4 = | −3.43763E−02 | −1.99910E−02 | −3.74805E−02 |
| A6 = | −1.03520E−01 | −9.93063E−03 | 3.66598E−02 |
| A8 = | 2.75882E−01 | 7.31640E−03 | −2.87157E−03 |
| A10 = | −3.57807E−01 | −7.82644E−04 | 8.35289E−03 |
| A12 = | −3.76931E−03 | 2.90388E−03 | −9.00030E−03 |
| A14 = | 2.00702E−01 | −5.67984E−03 | 1.52213E−03 |
| A16 = | | 1.49959E−03 | |

| | Surface # | | |
|---|---|---|---|
| | 5 | 6 | 7 |
| k = | −2.92879E+00 | −1.33744E+01 | 0.00000E+00 |
| A4 = | −1.79518E−02 | 1.16914E−02 | 4.39670E−02 |
| A6 = | 1.12699E−02 | −1.24783E−03 | −3.76322E−03 |
| A8 = | −3.26537E−03 | −5.52637E−04 | −2.88767E−04 |
| A10 = | 7.87304E−05 | −4.52673E−05 | −1.73528E−04 |
| A12 = | 3.70979E−04 | 2.18679E−05 | 5.16911E−05 |
| A14 = | −1.27107E−04 | −4.58971E−06 | −3.86435E−06 |

With reference to Table 10 and FIG. 4B for the optical lens assembly for image capture of this preferred embodiment, the focal length of the optical lens assembly for image capture is f=4.23 (mm), the overall aperture value (f-number) of the optical lens assembly for image capture is Fno=2.85, the half of maximum view angle is HFOV=37.8°. After the optical data of this preferred embodiment are calculated and derived, the optical lens assembly satisfies related conditions as shown in Table 12 below, and the related symbols have been described above and thus will not be described again.

TABLE 12

Data of related relations of this preferred embodiment

| Relation | Data | Relation | Data |
|---|---|---|---|
| $v_1 - v_2$ | 34.5 | $R_5/R_6$ | −0.36 |
| $CT_2/f$ | 0.09 | $f/f_1$ | 1.38 |

TABLE 12-continued

Data of related relations of this preferred embodiment

| Relation | Data | Relation | Data |
|---|---|---|---|
| $T_{12}/f$ | 0.21 | $|f_2|/f_3$ | 0.72 |
| $|R_3/R_4|$ | 0.49 | SL/TTL | 1.02 |

According to the optical data as shown in Table 10 and the aberration curve as shown in FIG. 4B, the optical lens assembly for image capture in accordance with this preferred embodiment of the present invention provides good correction results in aspects of the longitudinal spherical aberration, astigmatic field curving, and distortion.

Fifth Preferred Embodiment

Figure 5A:
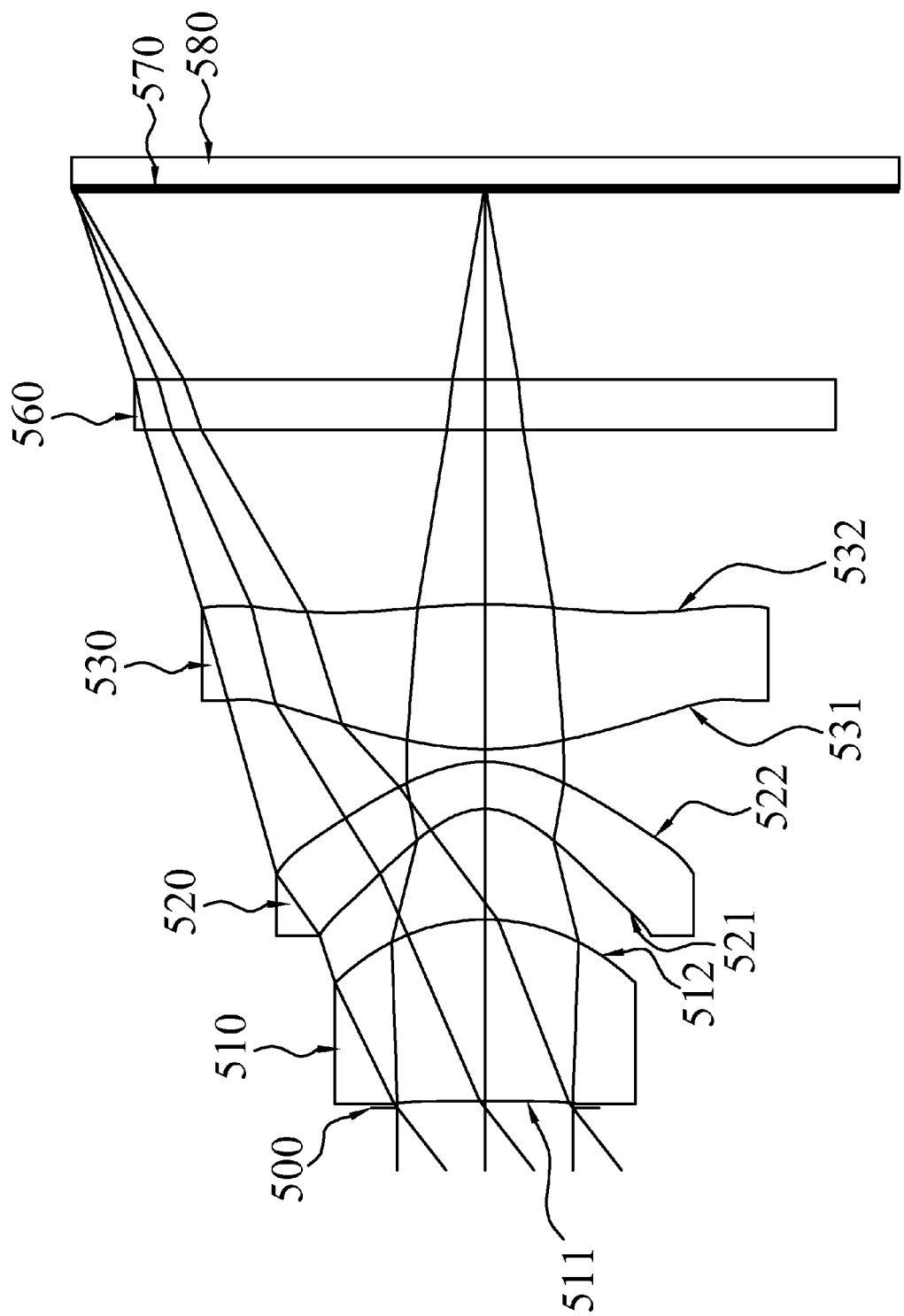
FIG. 5A is a schematic view of an optical lens assembly for image capture in accordance with the fifth preferred embodiment of the present invention.
Figure 5B:
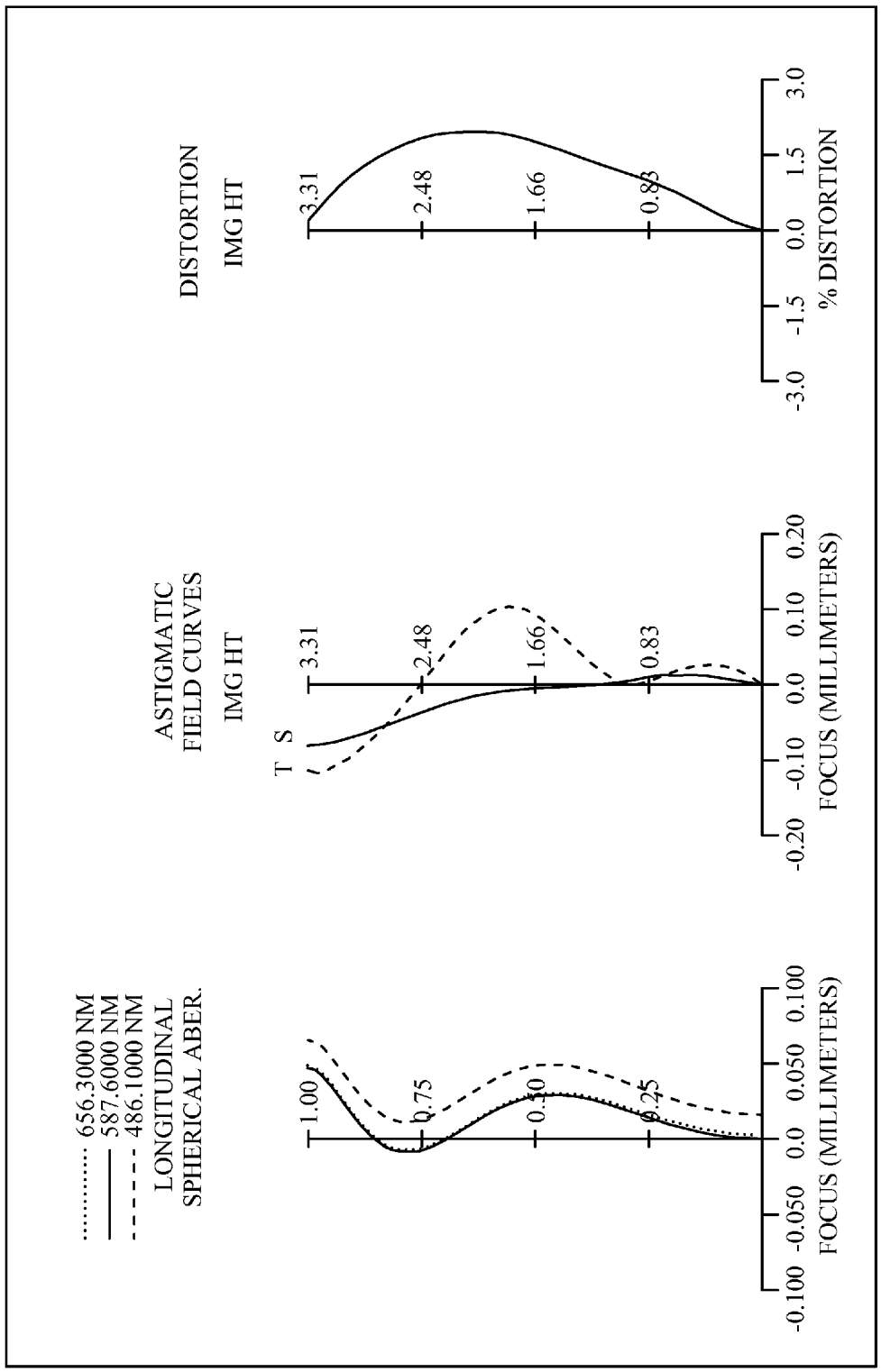
FIG. 5B is a series of aberration curves of the fifth preferred embodiment of the present invention.

With reference to FIGS. 5A and 5B for a schematic view and a series of aberration curves of an optical lens assembly for image capture in accordance with the fifth preferred embodiment of the present invention respectively, the optical lens assembly for image capture comprises three lens elements, an aperture stop (500) and an IR-filter (560). The optical lens assembly for image capture, sequentially arranged from an object side to an image side on an optical axis, comprises: the aperture stop (500); a first lens element (510) with positive refractive power, made of plastic, and having a concave object-side surface (511) and a convex image-side surface (512), and both object-side surface (511) and image-side surface (512) of the first lens element (510) being aspheric; a second lens element (520) with negative refractive power, made of plastic, and having a concave object-side surface (521) and a convex image-side surface (522), and both object-side surface (521) and image-side surface (522) of the second lens element (520) being aspheric; a bi-convex third lens element (530) with positive refractive power, made of plastic, and both object-side surface (531) and image-side surface (532) of the third lens element (530) being aspheric, and at least one of the object-side surface (531) and image-side surface (532) of the third lens element (530) having at least one inflection point; the IR-filter (560), made of glass, which is a panel glass for adjusting a wavelength section of the light of an image. With the combination of the three lens elements, the aperture stop (500) and the IR-filter (560), an image of the object to be photographed can be formed on an image plane (570).

TABLE 13

Optical data of this preferred embodiment
f = 4.24 mm, Fno = 3.02, HFOV = 37.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.057 | | | | |
| 2 | Lens 1 | −36.035900 (ASP) | 1.452 | Plastic | 1.544 | 55.9 | 3.05 |
| 3 | | −1.610600 (ASP) | 0.887 | | | | |
| 4 | Lens 2 | −0.505680 (ASP) | 0.376 | Plastic | 1.650 | 21.4 | −2.18 |
| 5 | | −1.017410 (ASP) | 0.100 | | | | |
| 6 | Lens 3 | 2.250270 (ASP) | 1.161 | Plastic | 1.535 | 56.3 | 3.05 |

TABLE 13-continued

Optical data of this preferred embodiment
f = 4.24 mm, Fno = 3.02, HFOV = 37.9 deg.

| Surface # | | Curvature Radius | Thickness | Material | Index | Abbe # | Focal Length |
|---|---|---|---|---|---|---|---|
| 7 | | −4.857900 (ASP) | 1.400 | | | | |
| 8 | IR- | Plano | 0.400 | Glass | 1.517 | 64.2 | — |
| 9 | filter | Plano | 1.532 | | | | |
| 10 | Image | Plano | — | | | | |

Note:
Reference wavelength is 587.6 nm. ASP stands for aspherical surfaces.

The optical data of this preferred embodiment are listed in Table 13, wherein the object-side surface and the image-side surface of the first lens element (510) to the third lens element (530) comply with the aspheric surface formula as given in Equation (11), and their aspheric coefficients are listed in Table 14 as follows:

TABLE 14

Aspheric coefficients of this preferred embodiment

| | Surface # | | |
|---|---|---|---|
| | 2 | 3 | 4 |
| k = | −1.00000E+00 | −9.19965E−01 | −1.72311E+00 |
| A4 = | −4.25627E−02 | −1.71384E−02 | −3.84307E−02 |
| A6 = | −4.48181E−02 | −1.98792E−02 | 2.75338E−02 |
| A8 = | 3.29407E−01 | −7.94133E−03 | 5.10348E−03 |
| A10 = | −1.05283E+00 | 2.91935E−02 | 1.25850E−02 |
| A12 = | 1.19598E+00 | 4.02167E−02 | −8.79619E−03 |
| A14 = | −3.73472E−01 | −7.72967E−02 | −7.00534E−04 |
| A16 = | | 2.85566E−02 | |

| | Surface # | | |
|---|---|---|---|
| | 5 | 6 | 7 |
| k = | −2.94595E+00 | −1.42975E+01 | 0.00000E+00 |
| A4 = | −1.98700E−02 | 1.12240E−02 | 4.55902E−02 |
| A6 = | 9.95096E−03 | −9.05844E−04 | −3.59648E−03 |
| A8 = | −4.08192E−03 | −3.10137E−04 | −9.05106E−05 |
| A10 = | 1.33015E−03 | −9.41985E−05 | −1.80965E−04 |
| A12 = | 5.69771E−04 | 2.28896E−05 | 4.11992E−05 |
| A14 = | −3.27449E−04 | −2.79117E−06 | −2.45088E−06 |

With reference to Table 13 and FIG. 5B for the optical lens assembly for image capture of this preferred embodiment, the focal length of the optical lens assembly for image capture is f=4.24 (mm), the overall aperture value (f-number) of the optical lens assembly for image capture is Fno=3.02, the half of maximum view angle is HFOV=37.9°. After the optical data of this preferred embodiment are calculated and derived, the optical lens assembly satisfies related conditions as shown in Table 15 below, and the related symbols have been described above and thus will not be described again.

TABLE 15

Data of related relations of this preferred embodiment

| Relation | Data | Relation | Data |
|---|---|---|---|
| $v_1 - v_2$ | 34.5 | $R_5/R_6$ | −0.46 |
| $CT_2/f$ | 0.09 | $f/f_1$ | 1.39 |
| $T_{12}/f$ | 0.21 | $|f_2|/f_3$ | 0.72 |
| $|R_3/R_4|$ | 0.50 | SL/TTL | 1.01 |

According to the optical data as shown in Table 13 and the aberration curve as shown in FIG. 5B, the optical lens assembly for image capture in accordance with this preferred embodiment of the present invention provides good correction results in aspects of the longitudinal spherical aberration, astigmatic field curving, and distortion.

Sixth Preferred Embodiment

Figure 6A:
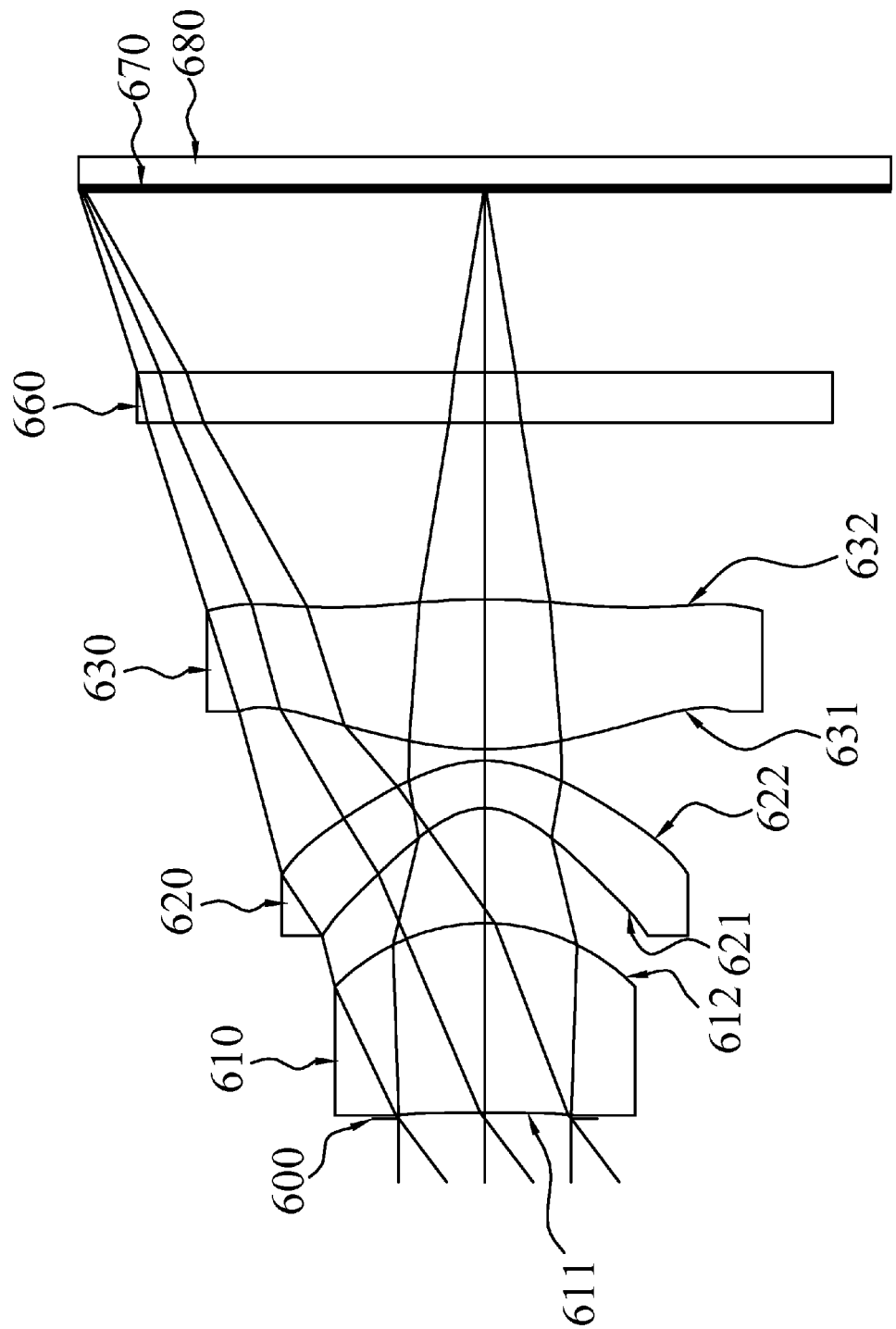
FIG. 6A is a schematic view of an optical lens assembly for image capture in accordance with the sixth preferred embodiment of the present invention.
Figure 6B:
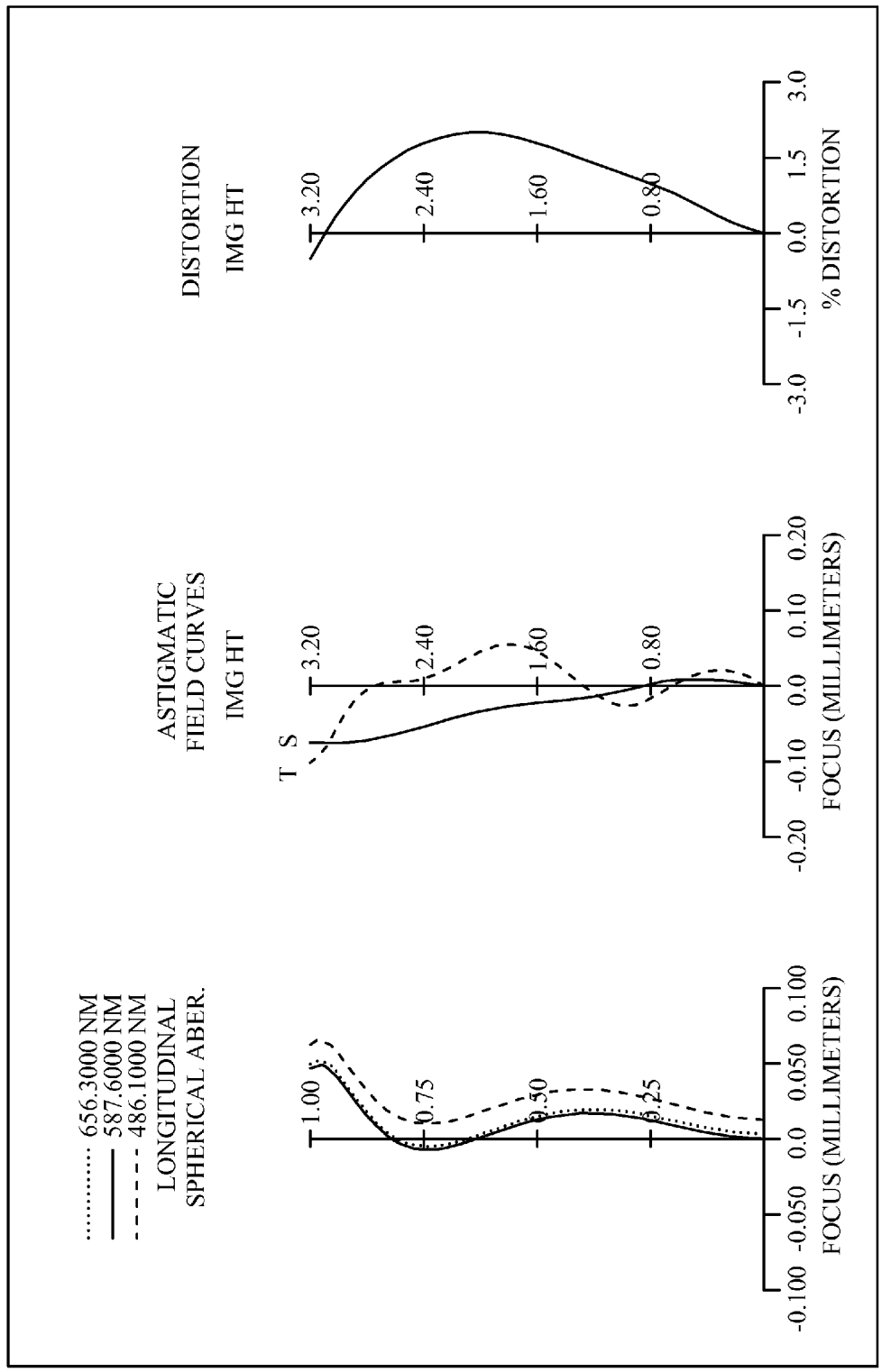
FIG. 6B is a series of aberration curves of the sixth preferred embodiment of the present invention.

With reference to FIGS. 6A and 6B for a schematic view and a series of aberration curves of an optical lens assembly for image capture in accordance with the first preferred embodiment of the present invention respectively, the optical lens assembly for image capture comprises three lens elements, an aperture stop (600) and an IR-filter (660). The optical lens assembly for image capture, sequentially arranged from an object side to an image side on an optical axis, comprises: the aperture stop (600); a first lens element (610) with positive refractive power, made of plastic, and having a concave object-side surface (611) and a convex image-side surface (612), and both object-side surface (611) and image-side surface (612) of the first lens element (610) being aspheric; a second lens element (620) with negative refractive power, made of plastic, and having a concave object-side surface (621) and a convex image-side surface (622), and both object-side surface (621) and image-side surface (622) of the second lens element (620) being aspheric; a bi-convex third lens element (630) with positive refractive power, made of plastic, and both object-side surface (631) and image-side surface (632) of the third lens element (630) being aspheric, and at least one of the object-side surface (631) and image-side surface (632) of the third lens element (630) having at least one inflection point; the IR-filter (660), made of glass, which is a panel glass for adjusting a wavelength section of the light of an image. With the combination of the three lens elements, the aperture stop (600) and the IR-filter (660), an image of the object to be photographed can be formed on an image plane (670).

TABLE 16

Optical data of this preferred embodiment
f = 4.24 mm, Fno = 3.10, HFOV = 37.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.050 | | | | |
| 2 | Lens 1 | −31.186800 (ASP) | 1.501 | Plastic | 1.544 | 55.9 | 3.04 |
| 3 | | −1.599520 (ASP) | 0.912 | | | | |
| 4 | Lens 2 | −0.506440 (ASP) | 0.375 | Plastic | 1.650 | 21.4 | −2.22 |
| 5 | | −1.007250 (ASP) | 0.091 | | | | |
| 6 | Lens 3 | 2.291130 (ASP) | 1.188 | Plastic | 1.535 | 56.3 | 3.11 |
| 7 | | −4.989100 (ASP) | 1.400 | | | | |
| 8 | IR- | Plano | 0.400 | Glass | 1.517 | 64.2 | — |
| 9 | filter | Plano | 1.458 | | | | |
| 10 | Image | Plano | — | | | | |

Note:
Reference wavelength is 587.6 nm. ASP stands for aspherical surfaces.

The optical data of this preferred embodiment are listed in Table 16, wherein the object-side surface and the image-side surface of the first lens element (610) to the third lens element (630) comply with the aspheric surface formula as given in Equation (11), and their aspheric coefficients are listed in Table 17 as follows:

TABLE 17

Aspheric coefficients of this preferred embodiment

| | Surface # | | |
|---|---|---|---|
| | 2 | 3 | 4 |
| k = | −1.00000E+00 | −7.84675E−01 | −1.72288E+00 |
| A4 = | −5.51006E−02 | −2.11054E−02 | −3.94183E−02 |
| A6 = | 8.51228E−02 | 2.08105E−03 | 3.30362E−02 |
| A8 = | −3.80836E−01 | −5.36799E−03 | 1.15165E−02 |
| A10 = | 9.90660E−01 | −8.85220E−03 | −6.76899E−03 |
| A12 = | −1.79781E+00 | 5.34880E−02 | −4.09736E−03 |
| A14 = | 1.39897E+00 | −5.96796E−02 | −6.18774E−06 |
| A16 = | | 1.90549E−02 | |

| | Surface # | | |
|---|---|---|---|
| | 5 | 6 | 7 |
| k = | −2.91791E+00 | −1.44191E+01 | 0.00000E+00 |
| A4 = | −2.05621E−02 | 1.06597E−02 | 4.60264E−02 |
| A6 = | 1.04038E−02 | −1.30820E−03 | −3.47428E−03 |
| A8 = | −3.81563E−03 | −3.05861E−04 | −4.00153E−04 |
| A10 = | 3.97959E−04 | −1.87208E−04 | −2.18625E−04 |
| A12 = | 2.16682E−04 | 1.47549E−05 | 5.70965E−05 |
| A14 = | −1.75522E−04 | −4.23196E−07 | −3.21434E−06 |

With reference to Table 16 and FIG. 6B for the optical lens assembly for image capture of this preferred embodiment, the focal length of the optical lens assembly for image capture is f=4.24 (mm), the overall aperture value (f-number) of the optical lens assembly for image capture is Fno=3.10, the half of maximum view angle is HFOV=37.2°. After the optical data of this preferred embodiment are calculated and derived, the optical lens assembly satisfies related conditions as shown in Table 18 below, and the related symbols have been described above and thus will not be described again.

TABLE 18

Data of related relations of this preferred embodiment

| Relation | Data | Relation | Data |
|---|---|---|---|
| $v_1 - v_2$ | 34.5 | $R_5/R_6$ | −0.46 |
| $CT_2/f$ | 0.09 | $f/f_1$ | 1.39 |
| $T_{12}/f$ | 0.21 | $|f_2|/f_3$ | 0.71 |
| $|R_3/R_4|$ | 0.50 | SL/TTL | 1.01 |

According to the optical data as shown in Table 16 and the aberration curve as shown in FIG. 6B, the optical lens assembly for image capture in accordance with this preferred embodiment of the present invention provides good correction results in aspects of the longitudinal spherical aberration, astigmatic field curving, and distortion.

Seventh Preferred Embodiment

Figure 7A:
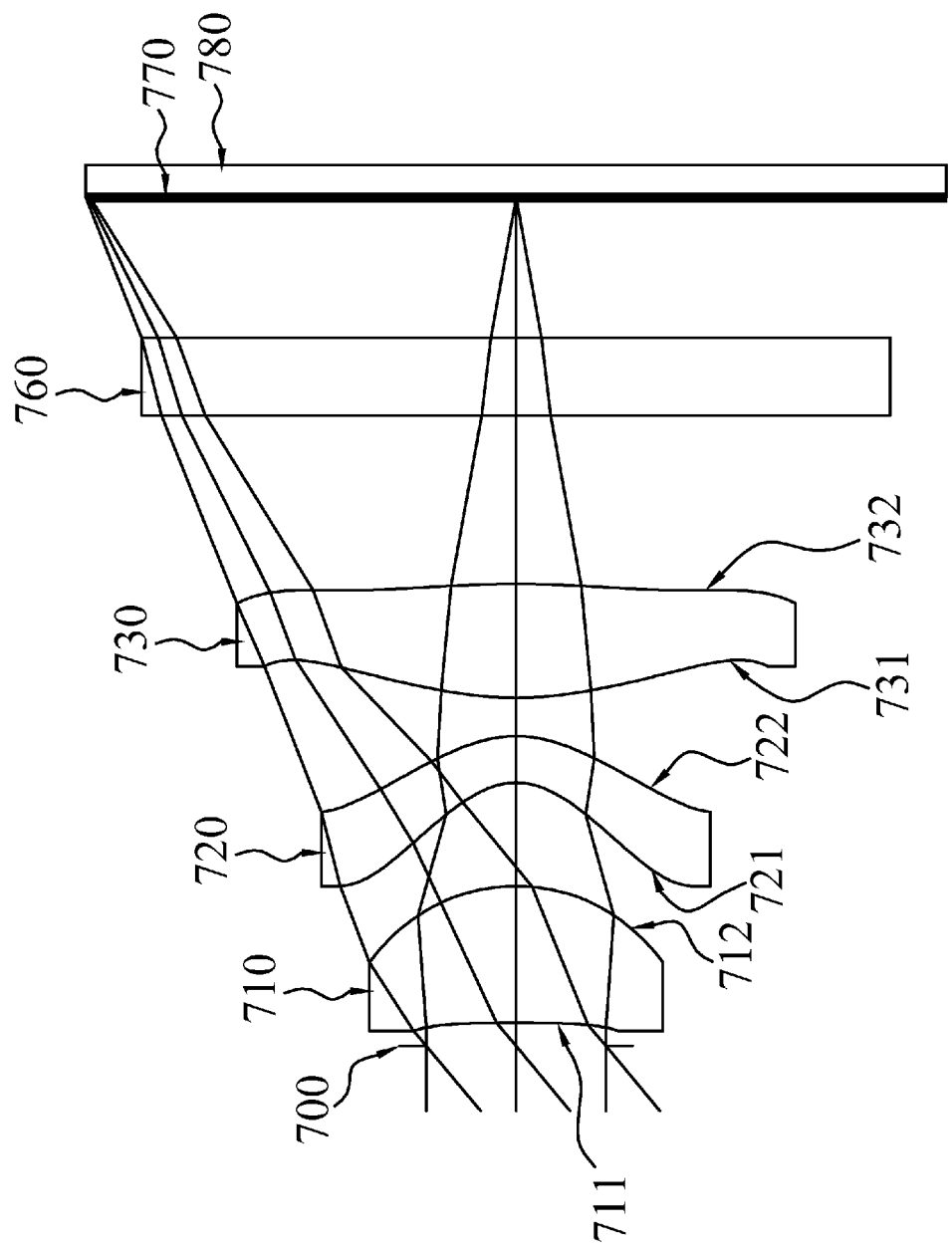
FIG. 7A is a schematic view of an optical lens assembly for image capture in accordance with the seventh preferred embodiment of the present invention.
Figure 7B:
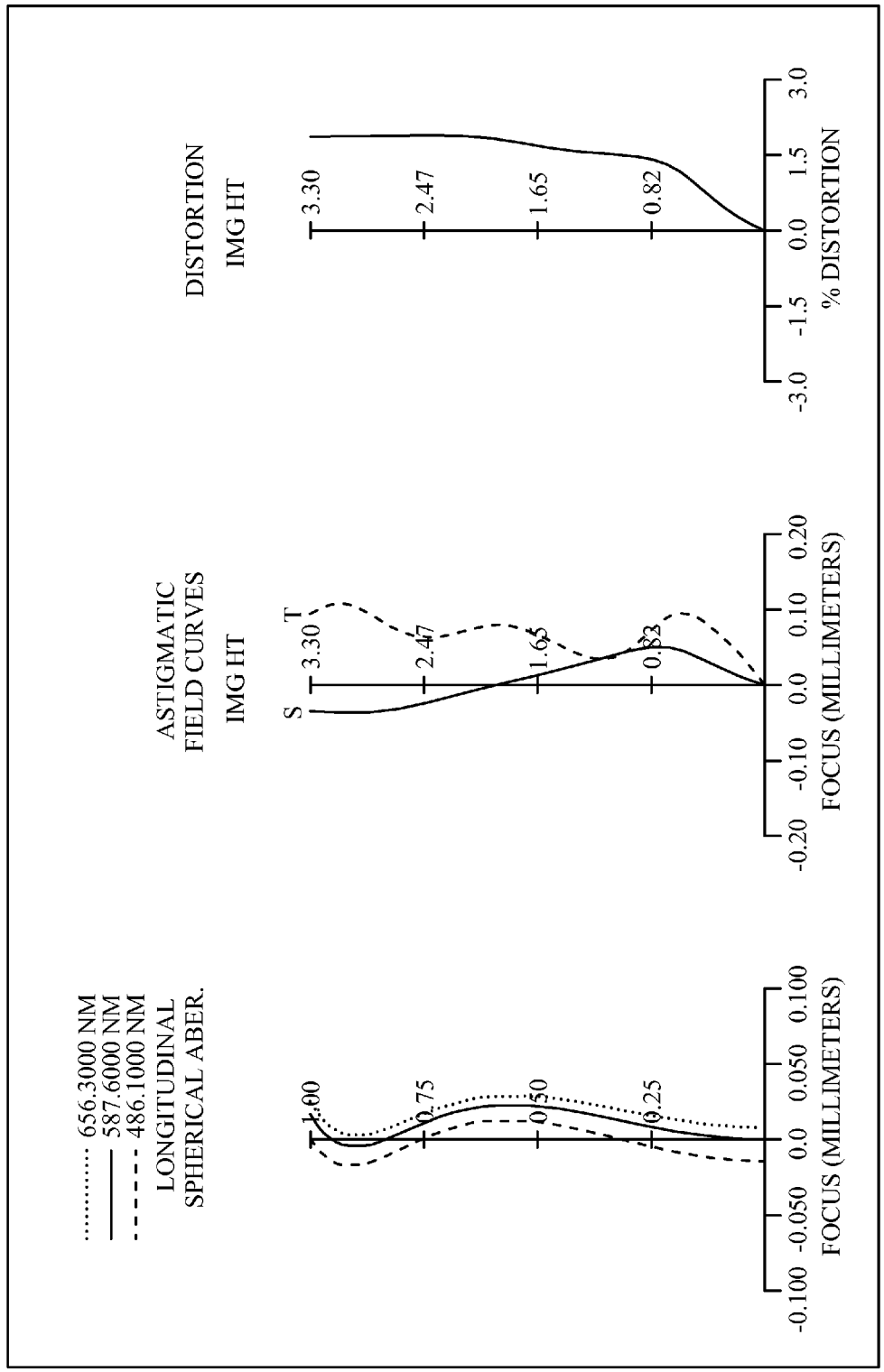
FIG. 7B is a series of aberration curves of the seventh preferred embodiment of the present invention.

With reference to FIGS. 7A and 7B for a schematic view and a series of aberration curves of an optical lens assembly for image capture in accordance with the first preferred embodiment of the present invention respectively, the optical lens assembly for image capture comprises three lens elements, an aperture stop (700) and an IR-filter (760). The optical lens assembly for image capture, sequentially arranged from an object side to an image side on an optical axis, comprises: the aperture stop (700); a first lens element (710) with positive refractive power, made of plastic, and having a concave object-side surface (711) and a convex image-side surface (712), and both object-side surface (711) and image-side surface (712) of the first lens element (710) being aspheric; a second lens element (720) with negative refractive power, made of plastic, and having a concave object-side surface (721) and a convex image-side surface (722), and both object-side surface (721) and image-side surface (722) of the second lens element (720) being aspheric; a bi-convex third lens element (730) with positive refractive power, made of plastic, and both object-side surface (731) and image-side surface (732) of the third lens element (730) being aspheric, and at least one of the object-side surface (731) and image-side surface (732) of the third lens element (730) having at least one inflection point; the IR-filter (760), made of glass, which is a panel glass for adjusting a wavelength section of the light of an image. With the combination of the three lens elements, the aperture stop (700) and the IR-filter (760), an image of the object to be photographed can be formed on an image plane (770).

TABLE 19

Optical data of this preferred embodiment
f = 3.90 mm, Fno = 2.80, HFOV = 39.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.180 | | | | |
| 2 | Lens 1 | −23.570500 (ASP) | 1.054 | Plastic | 1.535 | 56.3 | 2.77 |
| 3 | | −1.412790 (ASP) | 0.799 | | | | |
| 4 | Lens 2 | −0.511220 (ASP) | 0.358 | Plastic | 1.634 | 23.8 | −2.74 |
| 5 | | −0.921900 (ASP) | 0.297 | | | | |
| 6 | Lens 3 | 2.694910 (ASP) | 0.878 | Plastic | 1.535 | 56.3 | 3.81 |
| 7 | | −7.413300 (ASP) | 1.300 | | | | |
| 8 | IR-filter | Plano | 0.600 | Glass | 1.517 | 64.2 | — |
| 9 | | Plano | 1.082 | | | | |
| 10 | Image | Plano | — | | | | |

Note:
Reference wavelength is 587.6 nm. ASP stands for aspherical surfaces.

The optical data of this preferred embodiment are listed in Table 19, wherein the object-side surface and the image-side surface of the first lens element (710) to the third lens element (730) comply with the aspheric surface formula as given in Equation (11), and their aspheric coefficients are listed in Table 21 as follows:

TABLE 20

Aspheric coefficients of this preferred embodiment

| | Surface # | | |
|---|---|---|---|
| | 2 | 3 | 4 |
| k = | −1.00000E+00 | −5.09043E−01 | −1.59522E+00 |
| A4 = | −7.89563E−02 | −4.54989E−02 | 7.08526E−03 |
| A6 = | −6.86485E−02 | −9.16921E−03 | 5.70290E−02 |
| A8 = | 1.70711E−02 | −6.81678E−03 | −7.07734E−03 |
| A10 = | 1.19154E−02 | 1.33255E−02 | 2.20059E−03 |
| A12 = | −1.82185E−01 | −7.60595E−03 | −1.30507E−03 |

TABLE 20-continued

Aspheric coefficients of this preferred embodiment

| | | | |
|---|---|---|---|
| A14 = | 1.14336E−01 | 8.94361E−04 | 6.48371E−05 |
| A16 = | | 2.27494E−04 | |

| | Surface # | | |
|---|---|---|---|
| | 5 | 6 | 7 |
| k = | −2.76113E+00 | −8.54483E+00 | −1.00000E+00 |
| A4 = | −9.22264E−03 | −8.30574E−03 | 2.64027E−02 |
| A6 = | 2.58584E−02 | 4.59439E−03 | −1.03159E−03 |
| A8 = | −4.60328E−03 | −1.67776E−03 | −5.67072E−04 |
| A10 = | −1.11016E−03 | 7.37078E−05 | −1.54102E−04 |
| A12 = | 2.62634E−04 | −4.45318E−06 | 4.01086E−05 |
| A14 = | 1.34004E−04 | −2.43998E−06 | −2.36138E−06 |

With reference to Table 19 and FIG. 7B for the optical lens assembly for image capture of this preferred embodiment, the focal length of the optical lens assembly for image capture is f=3.90 (mm), the overall aperture value (f-number) of the optical lens assembly for image capture is Fno=2.80, the half of maximum view angle is HFOV=39.9°. After the optical data of this preferred embodiment are calculated and derived, the optical lens assembly satisfies related conditions as shown in Table 21 below, and the related symbols have been described above and thus will not be described again.

TABLE 21

Data of related relations of this preferred embodiment

| Relation | Data | Relation | Data |
|---|---|---|---|
| $v_1 - v_2$ | 32.5 | $R_5/R_6$ | −0.36 |
| $CT_2/f$ | 0.09 | $f/f_1$ | 1.40 |
| $T_{12}/f$ | 0.20 | $|f_2|/f_3$ | 0.72 |
| $|R_3/R_4|$ | 0.55 | SL/TTL | 1.03 |

According to the optical data as shown in Table 19 and the aberration curve as shown in FIG. 7B, the optical lens assembly for image capture in accordance with this preferred embodiment of the present invention provides good correction results in aspects of the longitudinal spherical aberration, astigmatic field curving, and distortion.

In the optical lens assembly for image capture of the present invention, the lens can be made of glass or plastic. If the lens is made of glass, the selection of the refractive power for the optical lens assembly for image capture can be more flexible. If the lens is made of plastic, the production cost can be reduced effectively. In addition, an aspherical surface can be formed on an optical surface of the lens, and the aspherical surface can be easily manufactured into shapes other than those within the limitation of a spherical surface to have more control factors for eliminating aberrations, so as to reduce the number of lenses used and the total length of the optical lens assembly for image photographing of the present invention.

In the optical lens assembly for image capture of the present invention, if the lens surface is convex, the lens surface in proximity to the optical axis is convex; and if the lens surface is concave, the lens surface in proximity to the optical axis is concave.

In the optical lens assembly for image capture of the present invention, at least one stop such as a glare stop or a field stop can be provided for reducing stray lights to improve the image quality. Furthermore, an aperture can be positioned in front or within the optical lens assembly for image capture by persons skilled in the art for the purpose of making adjustments in preferred optical features.

Tables 1 to 21 show changes of values of an optical lens assembly for image capture in accordance with different preferred embodiments of the present invention respectively. However, the changes of values in the preferred embodiments of the present invention are obtained from experiments, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An optical lens assembly for image capture, sequentially arranged from an object side to an image side with no intervening lenses, comprising:

a first lens element with positive refractive power, having a concave object-side surface in proximity to an optical axis and a convex image-side surface in proximity to the optical axis;

a second lens element with negative refractive power, having a concave object-side surface in proximity to the optical axis and a convex image-side surface in proximity to the optical axis; and a third lens element with positive refractive power, having a convex object-side surface in proximity to the optical axis and a convex image-side surface in proximity to the optical axis, wherein the optical lens assembly for image capture has a total of three lens elements with refractive power;

wherein f is a focal length of the optical lens assembly for image capture, $f_1$ is a focal length of the first lens element, and the condition of $1.0 < f/f_1 < 1.9$ is satisfied; and wherein $R_5$ is a curvature radius of the object-side surface of the third lens element, $R_6$ is a curvature radius of the image-side surface of the third lens element, and the condition of $-0.7 < R_5/R_6 < 0$ is satisfied.

2. The optical lens assembly for image capture of claim 1, wherein the second lens element and the third lens element are made of plastic; each of the second lens element and the third lens element has an object-side surface and an image-side surface, at least one of the object-side surface and the image-side surface of both the second lens element and the third lens element being aspheric; the third lens element has at least one inflection point.

3. The optical lens assembly for image capture of claim 2, further comprising a stop; wherein SL is an axial distance between the stop and an image plane, TTL is an axial distance from the object-side surface of the first lens element to the image plane, and the condition of $0.90 < SL/TTL < 1.20$ is satisfied.

4. The optical lens assembly for image capture of claim 3, wherein f is a focal length of the optical lens assembly for image capture, $f_1$ is a focal length of the first lens element, and the condition of $1.2 < f/f_1 < 1.6$ is satisfied.

5. The optical lens assembly for image capture of claim 3, wherein $R_3$ is a curvature radius of the object-side surface of the second lens element, $R_4$ is a curvature radius of the image-side surface of the second lens element, and the condition of $0.3 < |R_3/R_4| < 0.8$ is satisfied.

6. The optical lens assembly for image capture of claim 3, wherein $v_1$ is an Abbe number of the first lens element, $v_2$ is an Abbe number of the second lens element, and the condition of $24 < v_1 - v_2 < 40$ is satisfied.

7. The optical lens assembly for image capture of claim 3, wherein $f_2$ is a focal length of the second lens element, $f_3$ is a focal length of the third lens element, and the condition of $0.6<|f_2|/f_3<0.9$ is satisfied.

8. The optical lens assembly for image capture of claim 2, wherein $CT_2$ is a central thickness of the second lens element, f is a focal length of the optical lens assembly for image capture, and the condition of $0.03<CT_2/f<0.13$ is satisfied.

* * * * *